United States Patent
Skarda

(10) Patent No.: US 11,302,093 B2
(45) Date of Patent: Apr. 12, 2022

(54) TEXT DETECTION, CARET TRACKING, AND ACTIVE ELEMENT DETECTION

(71) Applicant: UiPath, Inc., New York, NY (US)

(72) Inventor: Vaclav Skarda, Domazlice (CZ)

(73) Assignee: UiPath, Inc., New York, NY (US)

( * ) Notice: Subject to any disclaimer, the term of this patent is extended or adjusted under 35 U.S.C. 154(b) by 65 days.

(21) Appl. No.: 16/865,978

(22) Filed: May 4, 2020

(65) Prior Publication Data
US 2021/0342623 A1 Nov. 4, 2021

Related U.S. Application Data

(63) Continuation of application No. 16/864,629, filed on May 1, 2020, now Pat. No. 11,080,548.

(51) Int. Cl.
| | | |
|---|---|---|
| G06V 10/00 | (2022.01) | |
| G06V 10/40 | (2022.01) | |
| G06V 10/25 | (2022.01) | |
| G06V 20/40 | (2022.01) | |
| G06V 30/10 | (2022.01) | |

(52) U.S. Cl.
CPC ............ G06V 10/40 (2022.01); G06V 10/25 (2022.01); G06V 20/41 (2022.01); G06V 30/10 (2022.01)

(58) Field of Classification Search
CPC .... G06K 9/00718; G06K 9/46; G06K 9/3233; G06K 2209/01; G06F 3/0482; G06F 3/04886
USPC ....................................... 382/181, 190, 229
See application file for complete search history.

(56) References Cited

U.S. PATENT DOCUMENTS

| | | |
|---|---|---|
| 7,379,600 B2 | 5/2008 | Derks et al. |
| 7,492,957 B1 | 2/2009 | Bonhaus et al. |
| 7,644,368 B2 | 1/2010 | Pins |
| 8,271,906 B1 | 9/2012 | Fong |
| 8,793,578 B2 | 7/2014 | Mounty et al. |

(Continued)

FOREIGN PATENT DOCUMENTS

| | | |
|---|---|---|
| CN | 102243570 A | 11/2011 |
| CN | 105659194 A | 6/2016 |

(Continued)

OTHER PUBLICATIONS

Daniel G Mariam, "Notice of Allowance", dated Apr. 7, 2021, U.S. Appl. No. 16/865,886.

(Continued)

*Primary Examiner* — Daniel G Mariam
(74) *Attorney, Agent, or Firm* — LeonardPatel PC; Michael A. Leonard, II; Sheetal S. Patel

(57) ABSTRACT

Detection of typed and/or pasted text, caret tracking, and active element detection for a computing system are disclosed. The location on the screen associated with a computing system where the user has been typing or pasting text, potentially including hot keys or other keys that do not cause visible characters to appear, can be identified and the physical position on the screen where typing or pasting occurred can be provided based on the current resolution of where one or more characters appeared, where the cursor was blinking, or both. This can be done by identifying locations on the screen where changes occurred and performing text recognition and/or caret detection on these locations. The physical position of the typing or pasting activity allows determination of an active or focused element in an application displayed on the screen.

19 Claims, 27 Drawing Sheets

(56) References Cited

U.S. PATENT DOCUMENTS

| | | | |
|---|---|---|---|
| 9,014,428 | B2 | 4/2015 | Hellman et al. |
| 9,555,544 | B2 | 1/2017 | Bataller et al. |
| 9,817,967 | B1 | 11/2017 | Shukla et al. |
| 10,235,192 | B2 | 3/2019 | Hall et al. |
| 10,365,799 | B2 | 7/2019 | Hosbettu et al. |
| 2003/0191559 | A1 | 10/2003 | Chatsinchai et al. |
| 2010/0225592 | A1 | 9/2010 | Jo |
| 2012/0218188 | A1 | 8/2012 | Kashitani |
| 2015/0103131 | A1 | 4/2015 | Denoue et al. |
| 2015/0160738 | A1 | 6/2015 | Lithwick et al. |
| 2015/0339213 | A1 | 11/2015 | Lee et al. |
| 2016/0062649 | A1 | 3/2016 | Kristensson |
| 2016/0078115 | A1 | 3/2016 | Battista, Jr. |
| 2016/0349928 | A1 | 12/2016 | Li et al. |
| 2017/0213082 | A1 | 7/2017 | Kumar et al. |
| 2017/0242676 | A1 | 8/2017 | Frayssignes |
| 2018/0060222 | A1 | 3/2018 | Kogan et al. |
| 2018/0107380 | A1 | 4/2018 | Raja et al. |
| 2018/0165264 | A1 | 6/2018 | Venkataraman et al. |
| 2018/0197123 | A1 | 7/2018 | Parimelazhagan et al. |
| 2018/0307824 | A1 | 10/2018 | Low et al. |
| 2018/0322004 | A1 | 11/2018 | Jain et al. |
| 2018/0359107 | A1 | 12/2018 | Asher et al. |
| 2018/0370033 | A1 | 12/2018 | Geffen et al. |
| 2019/0156165 | A1 | 5/2019 | Nakano |
| 2019/0324781 | A1 | 10/2019 | Ramamurthy et al. |
| 2020/0050848 | A1 | 2/2020 | Wyle et al. |

FOREIGN PATENT DOCUMENTS

| | | |
|---|---|---|
| CN | 108702550 A | 10/2018 |
| JP | H06274679 A | 9/1994 |
| JP | 2004213095 A | 7/2004 |
| JP | 2006274679 A | 10/2006 |
| JP | 2011081778 A | 4/2011 |
| JP | 2018190247 A | 11/2018 |
| KR | 1020090035752 A | 4/2009 |
| KR | 1020150075728 A | 7/2015 |
| KR | 1020150104126 A | 9/2015 |
| KR | 1020170086228 A | 7/2017 |
| KR | 1020190095651 A | 8/2019 |
| WO | 2017001560 A1 | 1/2017 |

OTHER PUBLICATIONS

Daniel G. Mariam, "Notice of Allowance", dated Mar. 25, 2021, U.S. Appl. No. 16/864,629.

Office Action issued in Korean Patent Application No. 10-2020-7028255 dated Apr. 14, 2021.

U.S. Appl. No. 16/864,708, filed May 1, 2020, Daniel Dines, Entire Document.

International Search Report and Written Opinion of the International Search Authority issued for PCT Application No. PCT/US2020/051873 dated Jan. 27, 2021.

International Search Report and Written Opinion of the International Search Authority issued for PCT Application No. PCT/US2020/051865 dated Jan. 29, 2021.

International Search Report and Written Opinion of the International Search Authority issued for PCT Application No. PCT/US2020/051868 dated Jan. 29, 2021.

International Search Report and Written Opinion of the International Search Authority issued for PCT Application No. PCT/US2020/051878 dated Jan. 29, 2021.

International Search Report and Written Opinion of the International Search Authority issued in PCT Application No. PCT/US2020/047271 dated Jan. 22, 2021.

Boris Katz et al., "Answering Questions about Moving Objects in Surveillance Videos," available at http://groups.csail.mit.edu/infolab/publications/Katz-etal-AAAI03.pdf (last accessed May 12, 2021.

Boris Katz et al., "Answering Questions about Moving Objects in Surveillance Videos," available at http://groups.csail.mit.edu/infolab/publications/Katz-etal-AAAI03.pdf (Mar. 1, 2003).

European Search Report issued in EP Application No. 20199051 dated Mar. 8, 2021.

European Search Report issued in EP Application No. 20199062 dated Mar. 8, 2021.

European Search Report issued in EP Application No. 20199083 dated Mar. 2, 2021.

European Search Report issued in EP Application No. 20199092 dated Mar. 5, 2021.

European Search Report issued in EP Application No. 20199146 dated Feb. 23, 2021.

Daniel G Mariam, "Non-Final Office Action", dated Aug. 2, 2021, U.S. Appl. No. 16/865,832.

Notice of Allowance issued in Korean Application No. 10-2020-7028255 dated Jun. 17, 2021.

Corrected Notice of Allowability and PTO-1449 Forms issued in U.S. Appl. No. 16/864,629 dated Jun. 7, 2021.

Notice of Allowance issued in U.S. Appl. No. 16/865,886 dated May 26, 2021.

Daniel G Mariam, "Notice of Allowance", dated Sep. 23, 2021, U.S. Appl. No. 16/865,832.

First Office Action issued in Chinese Application No. 202080002350.5 dated Sep. 28, 2021.

Office Action issued in Korean Application No. 10-2020-7028256 dated Oct. 28, 2021.

Office Action issued in Korean Application No. 10-2020-7028275 dated Oct. 28, 2021.

Christophers McCarthy, "Non-Final Office Action", dated Dec. 29, 2021, U.S. Appl. No. 16/864,708.

Google Scholar/Patents—text refined (Year: 2021).

Notice of Allowance issued in Korean Application No. 10-2020-7028256 dated Feb. 4, 2022.

Notice of Allowance issued in Korean Application No. 10-2020-7028275 dated Feb. 4, 2022.

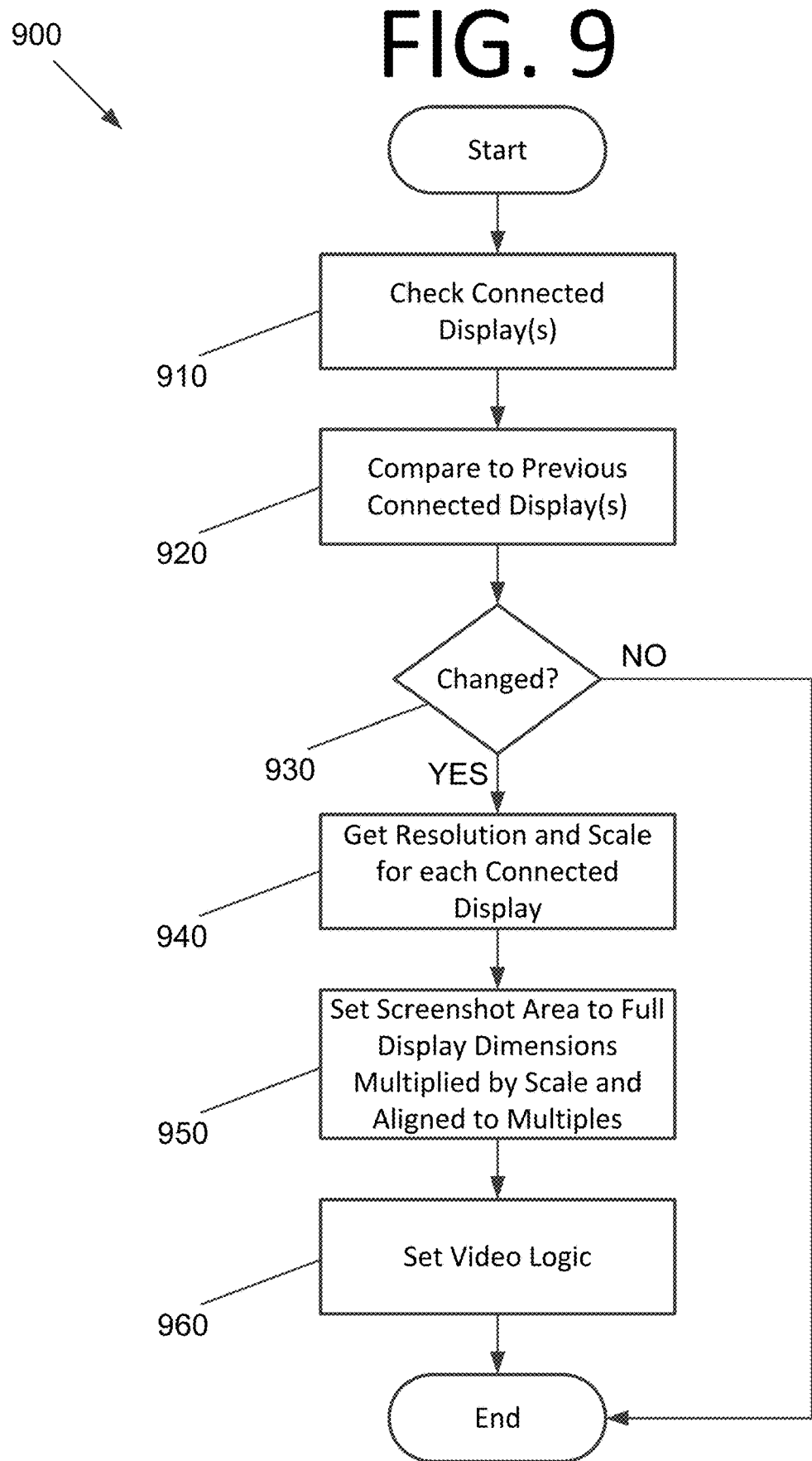

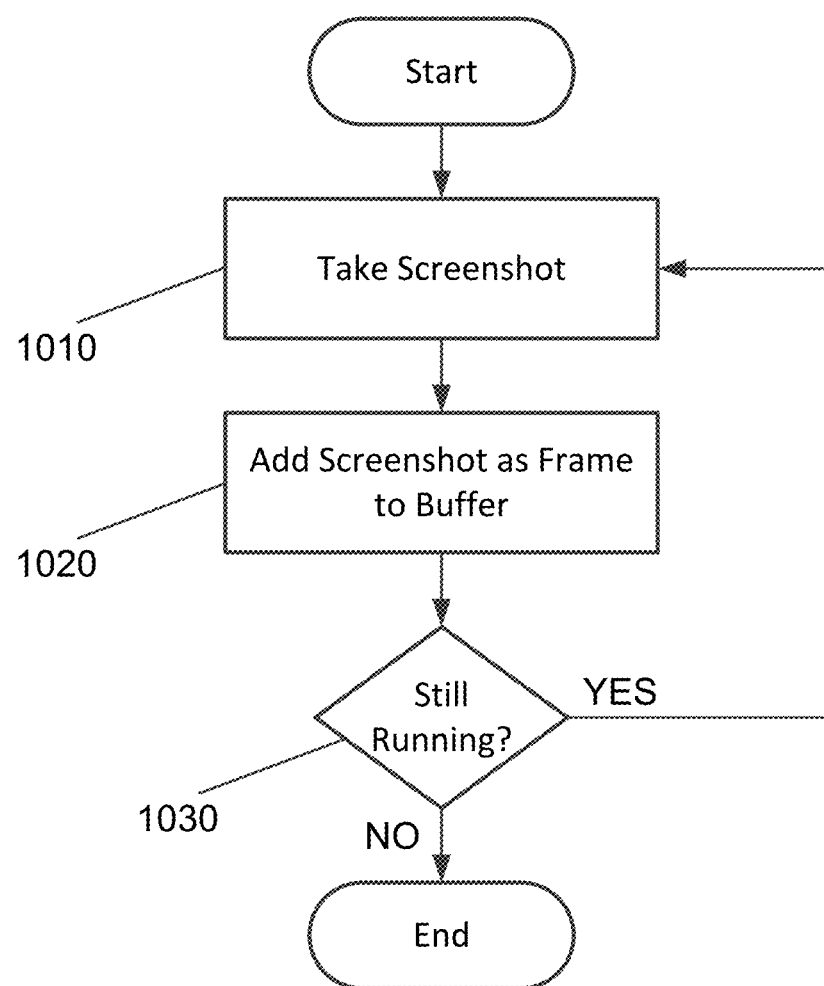

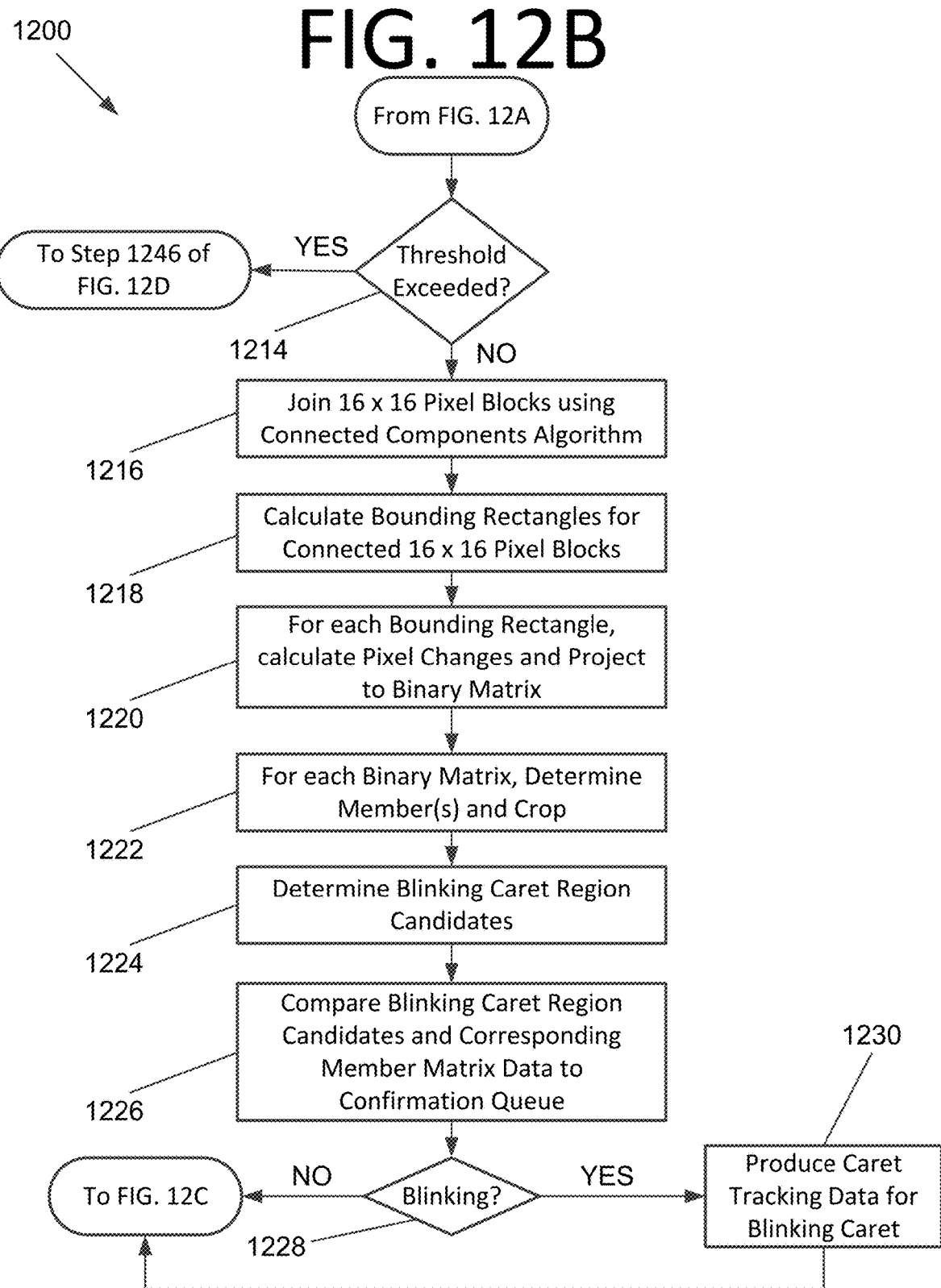

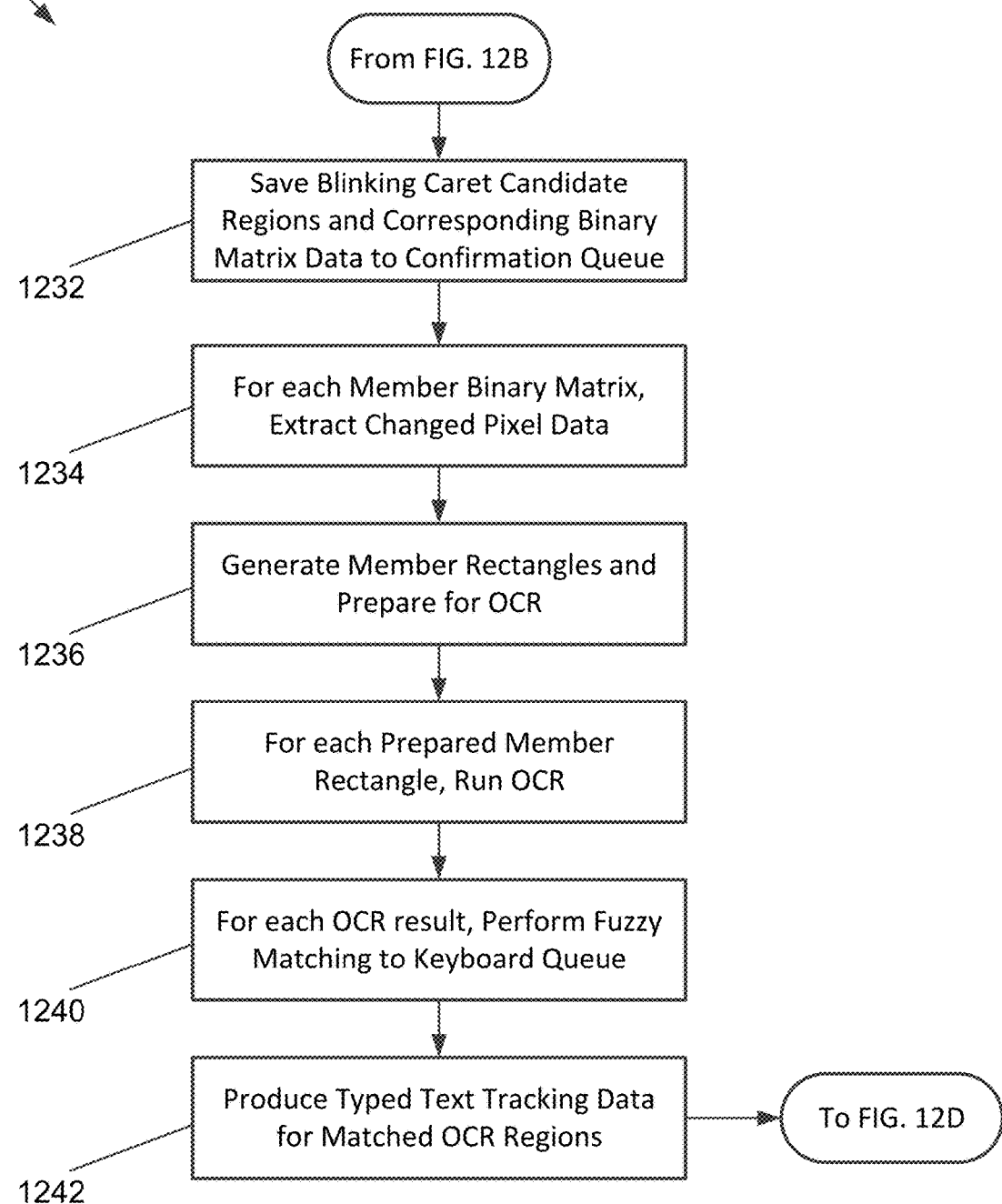

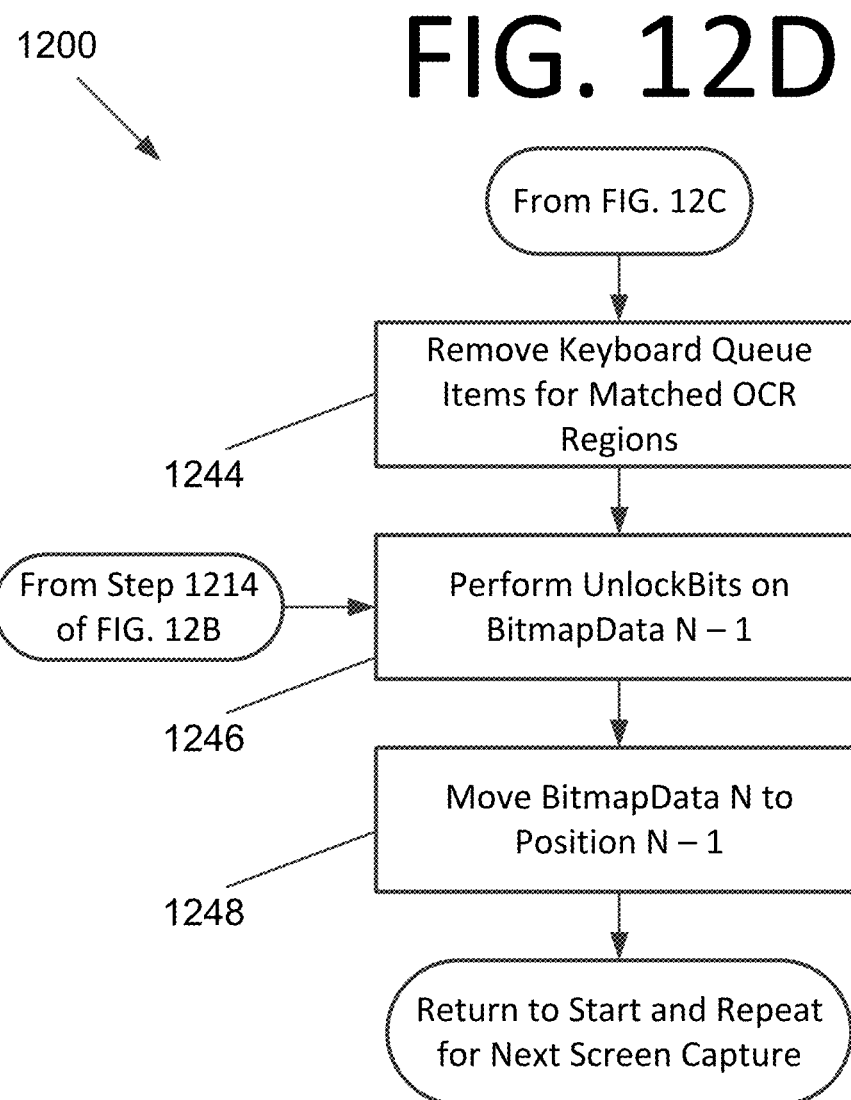

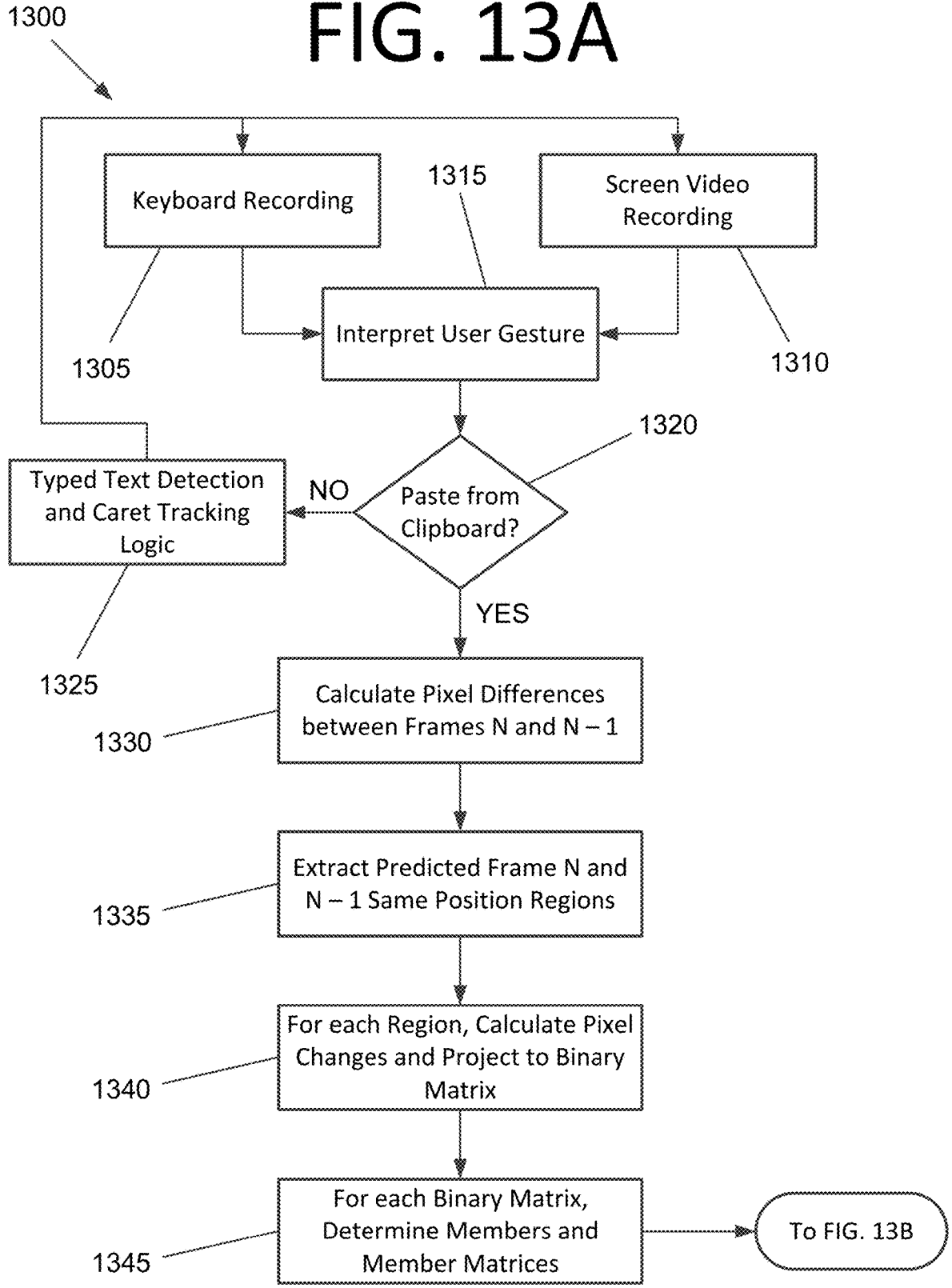

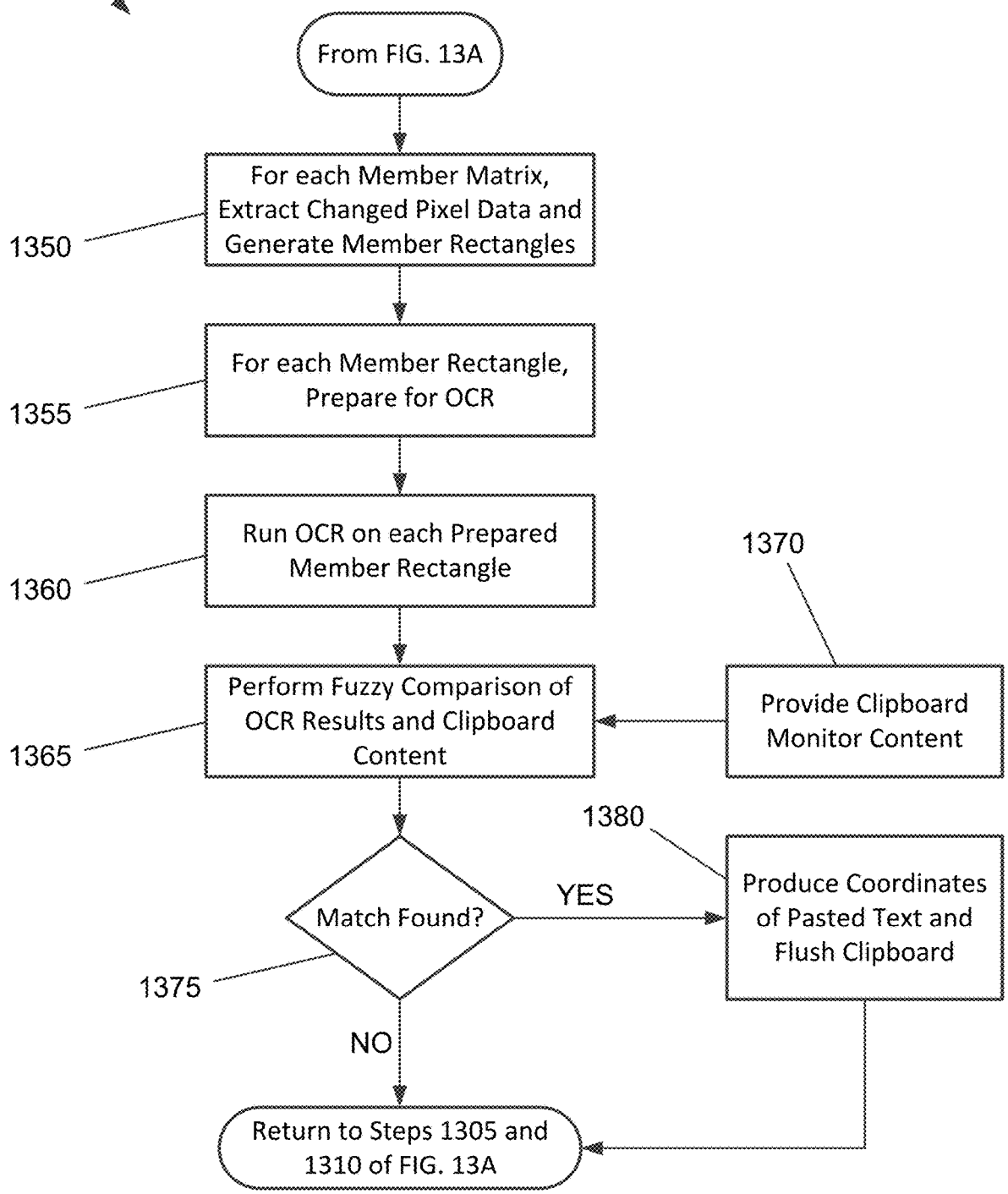

| 1 | 1 | 1 | 1 | 1 | 1 | 1 |
|---|---|---|---|---|---|---|
| 1 | 0 | 0 | 0 | 0 | 0 | 0 |
| 1 | 0 | 0 | 0 | 0 | 0 | 0 |
| 1 | 0 | 0 | 0 | 0 | 0 | 0 |
| 1 | 1 | 1 | 1 | 0 | 0 | 0 |
| 1 | 0 | 0 | 0 | 0 | 0 | 0 |
| 1 | 0 | 0 | 0 | 0 | 0 | 0 |
| 1 | 0 | 0 | 0 | 0 | 0 | 0 |
| 1 | 1 | 1 | 1 | 1 | 1 | 1 |

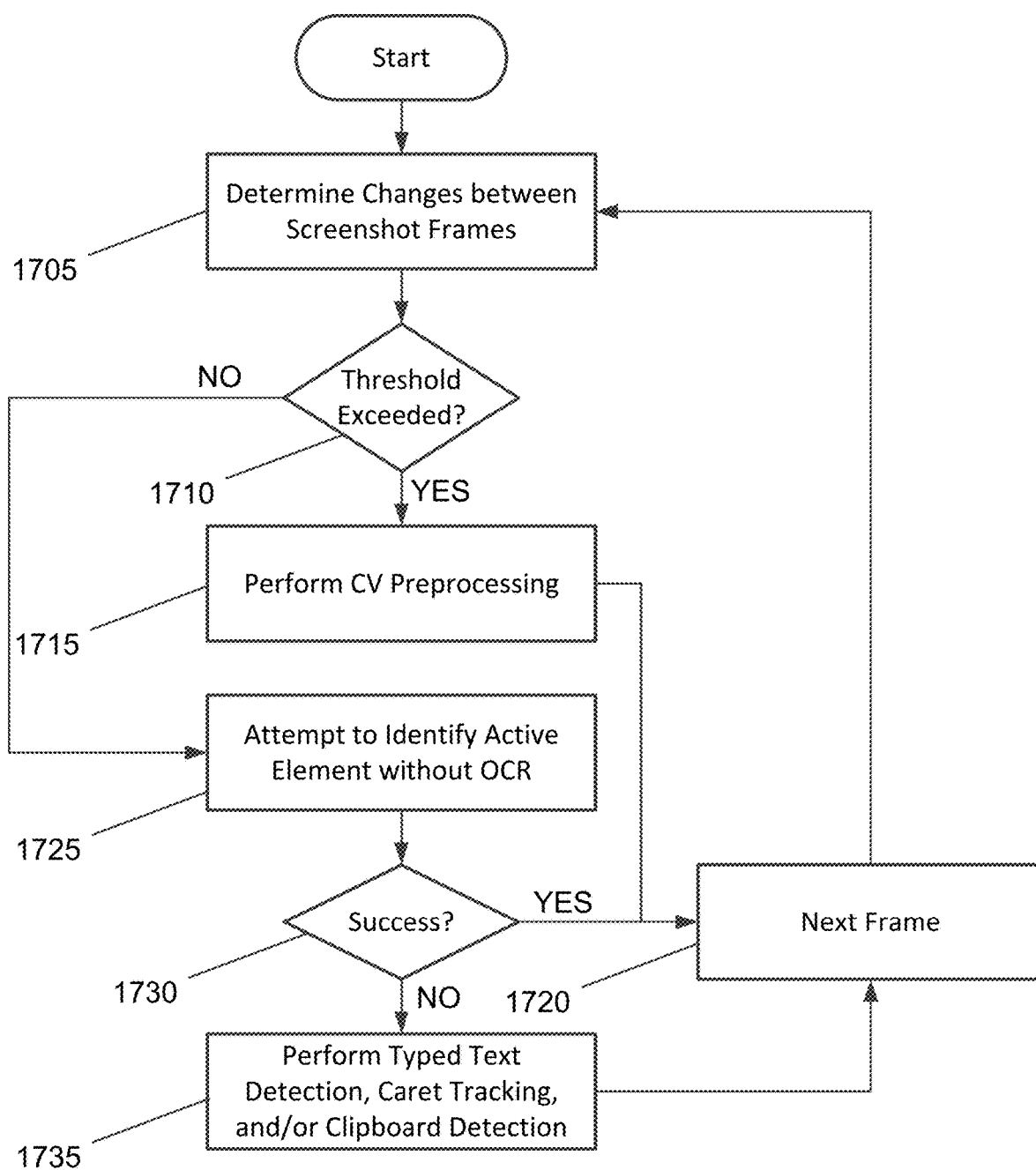

TEXT DETECTION, CARET TRACKING, AND ACTIVE ELEMENT DETECTION

CROSS REFERENCE TO RELATED APPLICATION

This application is a continuation of, and claims the benefit of, U.S. patent application Ser. No. 16/864,629 filed May 1, 2020. The subject matter of this earlier filed application is hereby incorporated by reference in its entirety.

FIELD

The present invention generally relates to computing system operation detection, and more specifically, to detection of typed and/or pasted text, caret tracking, and active element detection for a computing system.

BACKGROUND

When users interact with input devices for a computing system, while key presses may be determined by key hooking, it may not be known which element on the screen the user is typing in. Thus, it may not be known what the active element is on the screen. Accordingly, an improved approach for monitoring of user interactions with the computing system may be beneficial.

SUMMARY

Certain embodiments of the present invention may provide solutions to the problems and needs in the art that have not yet been fully identified, appreciated, or solved by current detection technologies. For example, some embodiments of the present invention pertain to detection of typed and/or pasted text, caret tracking, and active element detection for a computing system.

In an embodiment, a computer program including typed text detection logic is embodied on a non-transitory computer-readable medium. The program configured to cause at least one processor to generate a keyboard character queue including key press events that occurred during a time window and determine one or more regions where a current screenshot frame differs from a previous screenshot frame. The current screenshot frame and the previous screenshot frame include an entire screen of a display or a portion thereof. The program is also configured to cause the at least one processor to extract one or more connected members in the one or more determined regions and perform OCR on the extracted one or more connected members, producing one or more recognized characters, one or more recognized character sequences, or both, and respective positions. The program is further configured to cause the at least one processor to compare the one or more recognized characters, the one or more recognized character sequences, or both, to the keyboard character queue and, when a character or character sequence matches a character or character sequence of the keyboard character queue, remove the character or character sequence from the keyboard character queue.

In another embodiment, a computer-implemented method for typed text detection for robotic process automation includes generating a keyboard character queue including key press events that occurred during a time window, by an RPA robot. The key press events include a character of a key that was pressed and a time that the key was pressed. The computer-implemented method also includes determining, by the RPA robot, one or more regions where a current screenshot frame differs from a previous screenshot frame. The current screenshot frame and the previous screenshot frame include an entire screen of a display or a portion thereof. The computer-implemented method further includes extracting one or more connected members in the one or more determined regions and performing OCR on the extracted one or more connected members, by the RPA robot, producing one or more recognized characters, one or more recognized character sequences, or both, and respective positions. Additionally, the computer-implemented method includes comparing the one or more recognized characters, the one or more recognized character sequences, or both, to the keyboard character queue, by the RPA robot. When a character or character sequence matches a character or character sequence of the keyboard character queue, the computer-implemented method includes removing the character or character sequence from the keyboard character queue, by the RPA robot, and setting a graphical element in the current screenshot frame with a position including the position of the matching character or character sequence as an active element, by the RPA robot.

In yet another embodiment, a computer program is embodied on a non-transitory computer-readable medium. The program configured to cause at least one processor to determine one or more regions where a current screenshot frame differs from a previous screenshot frame. The current screenshot frame and the previous screenshot frame include an entire screen of a display or a portion thereof. The program is also configured to cause the at least one processor to extract one or more connected members in the one or more determined regions and perform OCR on the extracted one or more connected members, producing one or more recognized characters, one or more recognized character sequences, or both, and respective positions. The program is further configured to cause the at least one processor to compare the one or more recognized characters, the one or more recognized character sequences, or both, to a keyboard character queue. When a character or character sequence matches a character or character sequence of the keyboard character queue, the program is configured to cause the at least one processor to remove the character or character sequence from the keyboard character queue and set a graphical element in the current screenshot frame with a position including the position of the matching character or character sequence as an active element.

In another embodiment, a computer program including caret tracking logic is embodied on a non-transitory computer-readable medium. The program is configured to cause at least one processor to determine one or more regions where a current screenshot frame differs from a previous screenshot frame. The current screenshot frame and the previous screenshot frame include an entire screen of a display or a portion thereof. The program is also configured to cause the at least one processor to calculate pixel changes for the one or more regions and project the calculated pixel changes to a binary matrix for each of the one or more regions. The program is further configured to cause the at least one processor to, for each binary matrix, extract blinking caret region candidates and join members in the binary matrix. Additionally, the program is configured to cause the at least one processor to extract shapes from the members and validate the shapes of the members against a shape of the caret.

In yet another embodiment, a computer program is embodied on a non-transitory computer-readable medium. The program is configured to cause at least one processor to analyze one or more regions where a current screenshot frame differs from a previous screenshot frame. The current screenshot frame and the previous screenshot frame include an entire screen of a display or a portion thereof. The program is also configured to cause the at least one processor to identify one or more caret candidates based on the analysis and perform validation to identify that a caret candidate of the one or more caret candidates is blinking. The program is further configured to cause the at least one processor to identify a location of a caret based on the validation and set a graphical element in the current screenshot frame with the location of the caret as an active element.

In still another embodiment, a computer-implemented method for performing caret tracking for RPA includes analyzing one or more regions where a current screenshot frame differs from a previous screenshot frame, by an RPA robot. The current screenshot frame and the previous screenshot frame include an entire screen of a display or a portion thereof. The computer-implemented method also includes identifying one or more caret candidates based on the analysis, by the RPA robot, and performing validation to identify that a caret candidate of the one or more caret candidates is blinking, by the RPA robot. The computer-implemented method further includes identifying a location of a caret based on the validation, by the RPA robot, and setting a graphical element in the current screenshot frame with the location of the caret as an active element, by the RPA robot.

In another embodiment, a computer program including pasted text detection logic is embodied on a non-transitory computer-readable medium. The program is configured to cause at least one processor to monitor a clipboard to determine whether content has been added to a clipboard for an operating system within a time window. When the content has been added to the clipboard within the time window, the program is configured to cause the at least one processor to determine one or more regions where a current screenshot frame differs from a previous screenshot frame, the current screenshot frame and the previous screenshot frame including, an entire screen of a display or a portion thereof, extract one or more connected members in the one or more determined regions and perform OCR on the extracted one or more connected members, producing one or more recognized characters, one or more recognized character sequences, or both, and respective positions, compare the one or more recognized characters, the one or more recognized character sequences, or both, to clipboard content, and when a character or character sequence matches a character or character sequence of the clipboard content, obtain coordinates of the pasted text and set a graphical element including the coordinates of the pasted text as an active element.

In yet another embodiment, a computer program including pasted text detection logic is embodied on a non-transitory computer-readable medium. The program configured to cause the at least one processor to determine whether clipboard content exists. When the clipboard content exists and the clipboard content was added during a time window, the program is configured to cause the at least one processor to determine one or more regions where a current screenshot frame differs from a previous screenshot frame, the current screenshot frame and the previous screenshot frame comprising an entire screen of a display or a portion thereof, extract one or more connected members in the one or more determined regions and perform OCR on the extracted one or more connected members, producing one or more recognized characters, one or more recognized character sequences, or both, and respective positions, compare the clipboard content to the one or more recognized characters, the one or more recognized character sequences, or both, and when the clipboard content matches the one or more recognized characters, the one or more recognized character sequences, or both, set a graphical element in the current screenshot frame with a position including the one or more recognized characters, the one or more recognized character sequences, or both, as an active element.

In still another embodiment, a computer-implemented method for pasted text detection for robotic process automation RPA when clipboard content exists and was added during a time window includes determining, by an RPA robot, one or more regions where a current screenshot frame differs from a previous screenshot frame. The current screenshot frame and the previous screenshot frame include an entire screen of a display or a portion thereof. The computer-implemented method also includes extracting one or more connected members in the one or more determined regions and performing OCR on the extracted one or more connected members, by the RPA robot, producing one or more recognized characters, one or more recognized character sequences, or both, and respective positions. The computer-implemented method further includes comparing the clipboard content to the one or more recognized characters, the one or more recognized character sequences, or both, by the RPA robot. When the clipboard content matches the one or more recognized characters, the one or more recognized character sequences, or both, the computer-implemented method additionally includes setting a graphical element in the current screenshot frame with a position including the one or more recognized characters, the one or more recognized character sequences, or both, as an active element, by the RPA robot.

In another embodiment, a computer program for preprocessing screenshot frames and detecting active elements is embodied on a non-transitory computer-readable medium. The program is configured to cause at least one processor to run computer vision (CV) preprocessing on a previous screenshot frame. The computer program is also configured to cause the at least one processor to determine types and locations of graphical elements in the previous screenshot frame and determine that a change occurred in a region where a current screenshot frame differs from the previous screenshot frame. The region is at least partially included within an area of one or more graphical elements that permit text entry. When the change occurred in one graphical element that permits text entry, the program is further configured to cause the at least one processor to set the graphical element where the change occurred as an active element.

In yet another embodiment, a computer program for preprocessing screenshot frames and detecting active elements is embodied on a non-transitory computer-readable medium. The program is configured to cause at least one processor to run CV preprocessing on a previous screenshot frame. The program is also configured to cause the at least one processor to determine types and locations of graphical elements in the previous screenshot frame and determine that a change occurred in a region where a current screenshot frame differs from the previous screenshot frame. The region is at least partially included within an area of one or more graphical elements that permit text entry. When the change occurred in one graphical element that permits text entry, the program is configured to cause the at least one processor to set the graphical element where the change occurred as an active element. When the change occurred in more than one graphical element that permits text entry, the program is configured to cause the at least one processor to generate a keyboard character queue of key press events that occurred during a time window, determine newly added key press events that occurred between the previous screenshot frame and the current screenshot frame, perform OCR on regions of the two or more graphical elements where the changes occurred, match the newly added key press events to one of the two or more graphical elements where the changes occurred, and set the matched graphical element as the active element.

In still another embodiment, a computer-implemented method for preprocessing screenshot frames and detecting active elements for RPA includes running CV preprocessing on a previous screenshot frame, by an RPA robot. The computer-implemented method also includes determining types and locations of graphical elements in the previous screenshot frame, by the RPA robot, and determining that a change occurred in a region where a current screenshot frame differs from the previous screenshot frame, by the RPA robot. The region is at least partially included within an area of one or more graphical elements that permit text entry. When the change occurred in one graphical element that permits text entry, the computer-implemented method further includes setting the graphical element where the change occurred as an active element, by the RPA robot.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 8A illustrates portions of screenshots including an alumni donation window for frames N−1 and N, respectively, according to an embodiment of the present invention.

FIG. 8B illustrates screenshot N−1 divided up into a square grid, according to an embodiment of the present invention.

FIG. 8C illustrates screenshot N divided up into a square grid, according to an embodiment of the present invention.

FIG. 8D illustrates screenshot N with a highlighted row including a change from screenshot N−1, according to an embodiment of the present invention.

FIG. 8E illustrates screenshot N with a highlighted cell in the highlighted row that includes a change from screenshot N−1, according to an embodiment of the present invention.

FIG. 8F illustrates screenshot N with a highlighted region that includes the change from screenshot N−1, according to an embodiment of the present invention.

FIG. 9 is a flowchart illustrating a process for checking for resolution changes, checking for changes in the range of connected displays, and setting up the caret tracking video logic to accommodate changes, according to an embodiment of the present invention.

FIG. 10 is a flowchart illustrating a process for a video recorder, according to an embodiment of the present invention.

FIGS. 12A-D are flowcharts illustrating a process for performing video processing for typed character tracking, caret tracking, and active element detection, according to an embodiment of the present invention.

FIGS. 13A and 13B are flowcharts illustrating a process for performing pasted text tracking, according to an embodiment of the present invention.

FIG. 14A illustrates an example binary matrix for the letter "E" included in four 16×16 blocks that have been combined into a 32×32 region, according to an embodiment of the present invention.

FIG. 14B illustrates a cropped 7×9 binary matrix for a member (the letter "E") included in the binary matrix for the region of FIG. 14A, according to an embodiment of the present invention.

FIG. 17 is a flowchart illustrating a process for performing preprocessing, typed text detection, caret tracking, and active element detection, according to an embodiment of the present invention.

Unless otherwise indicated, similar reference characters denote corresponding features consistently throughout the attached drawings.

DETAILED DESCRIPTION OF THE EMBODIMENTS

Some embodiments pertain to detection of typed and/or pasted text, caret tracking, and active element detection for a computing system. Some embodiments recognize where on the screen associated with a computing system the user has been typing or pasting text, potentially including hot keys or other keys that do not cause visible characters to appear, and provide the physical position on the screen based on the current resolution (e.g., in coordinates) of where one or more characters appeared, where the cursor was blinking, or both. The physical position of the typing or pasting activity and/or of the caret may allow determination of which field(s) the user is typing in or focused on and what the application is for process discovery or other applications.

Some embodiments are implemented in a feedback loop process that continuously or periodically compares the current screenshot to the previous screenshot to identify changes. Locations where visual changes occurred on the screen may be identified and optical character recognition (OCR) may be performed on the location where the change occurred. Results of the OCR may then be compared to the content of a keyboard queue (e.g., as determined by key hooking) to determine whether a match exists. The locations where the change occurred may be determined by comparing a box of pixels from the current screenshot to a box of pixels in the same location from a previous screenshot.

Figure 1:
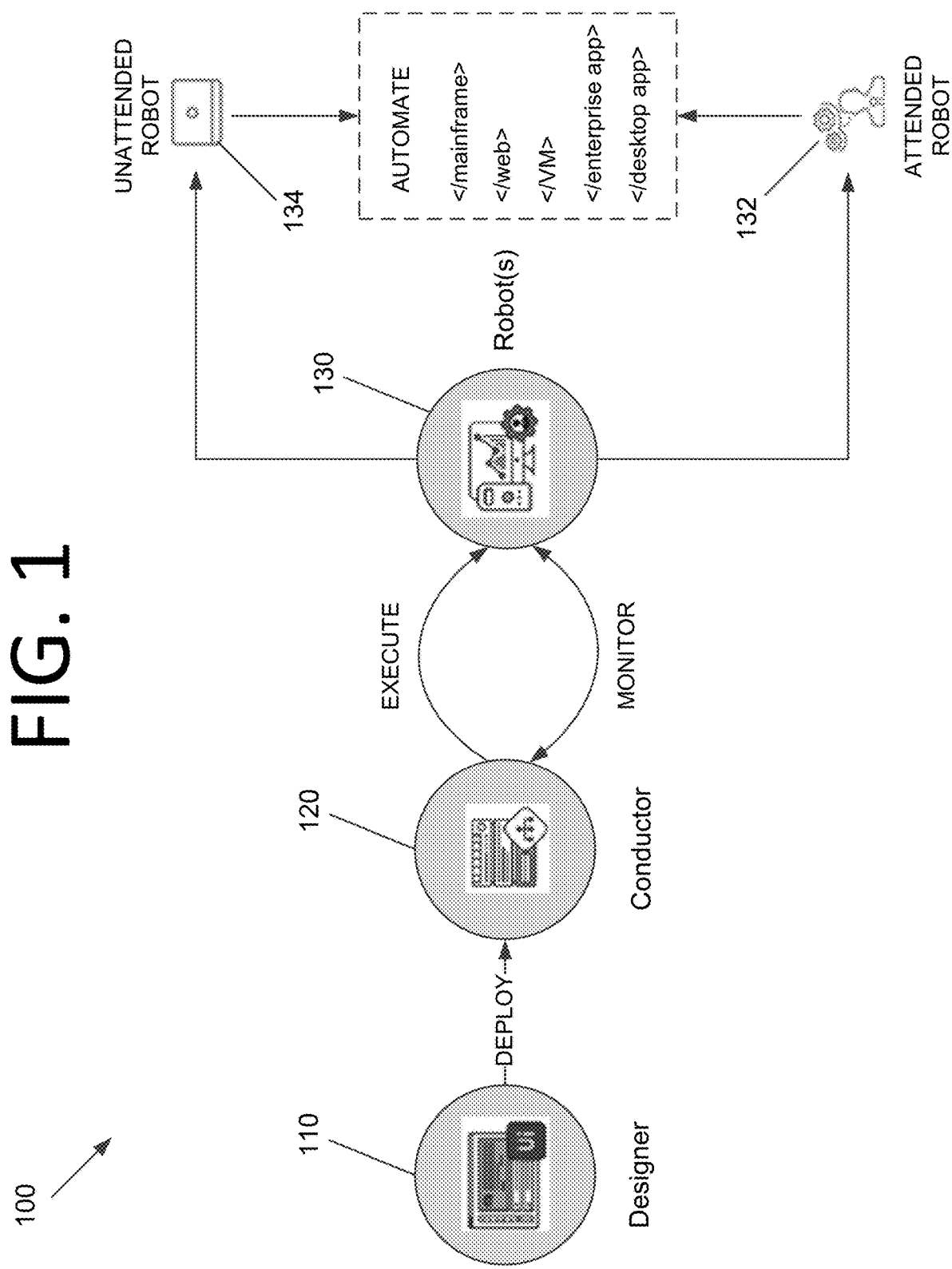
FIG. 1 is an architectural diagram illustrating a robotic process automation (RPA) system, according to an embodiment of the present invention.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
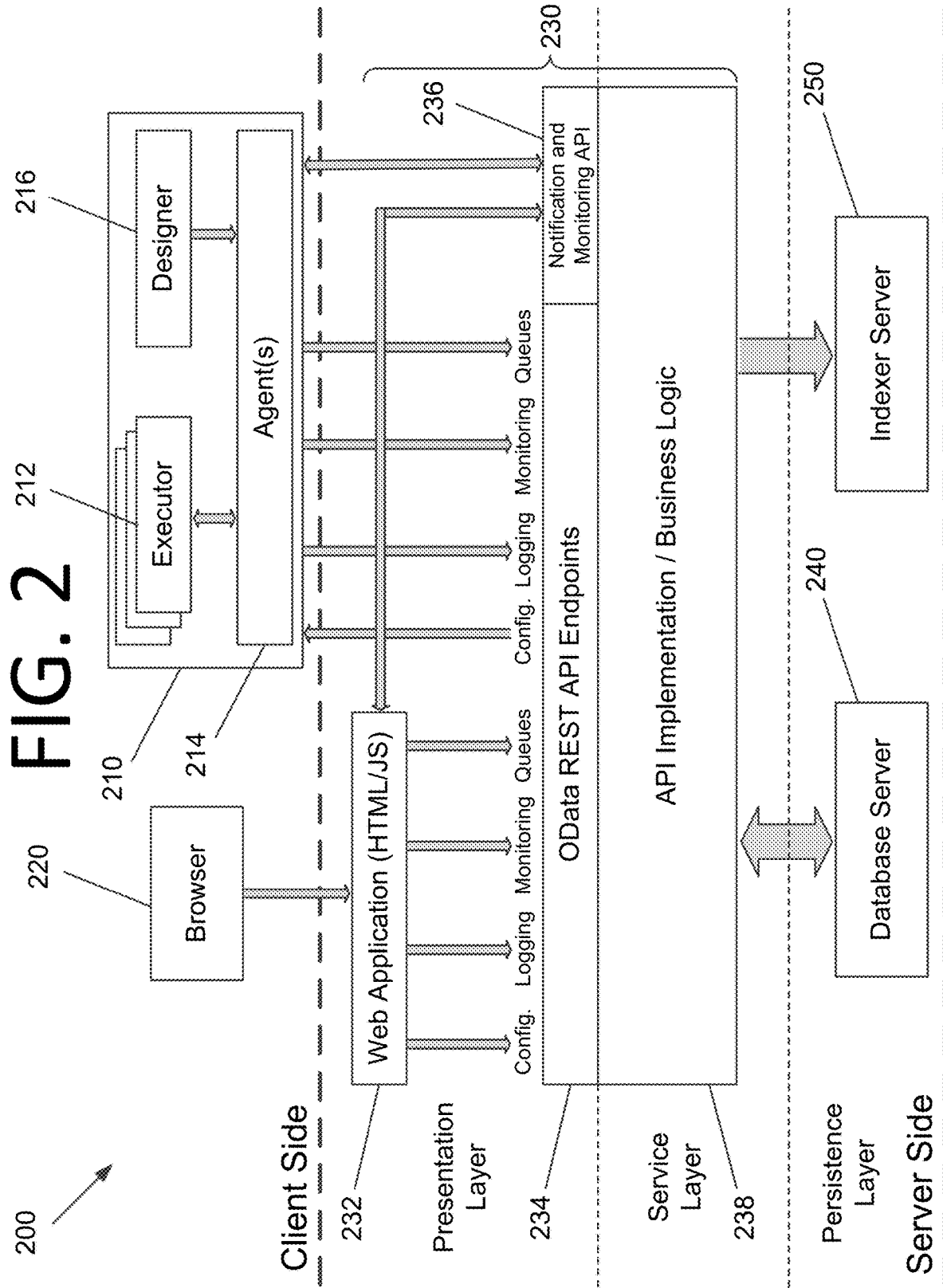
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
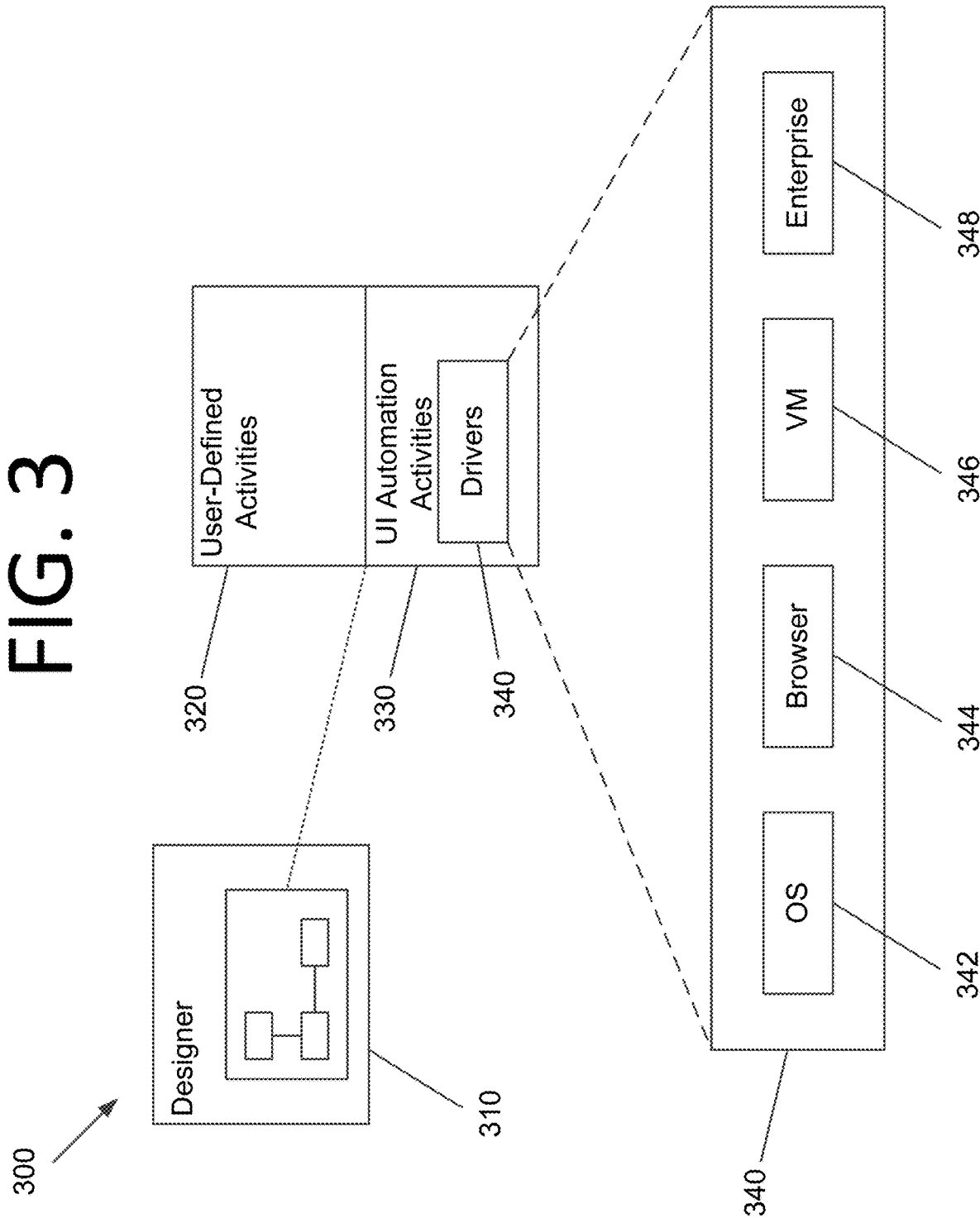
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
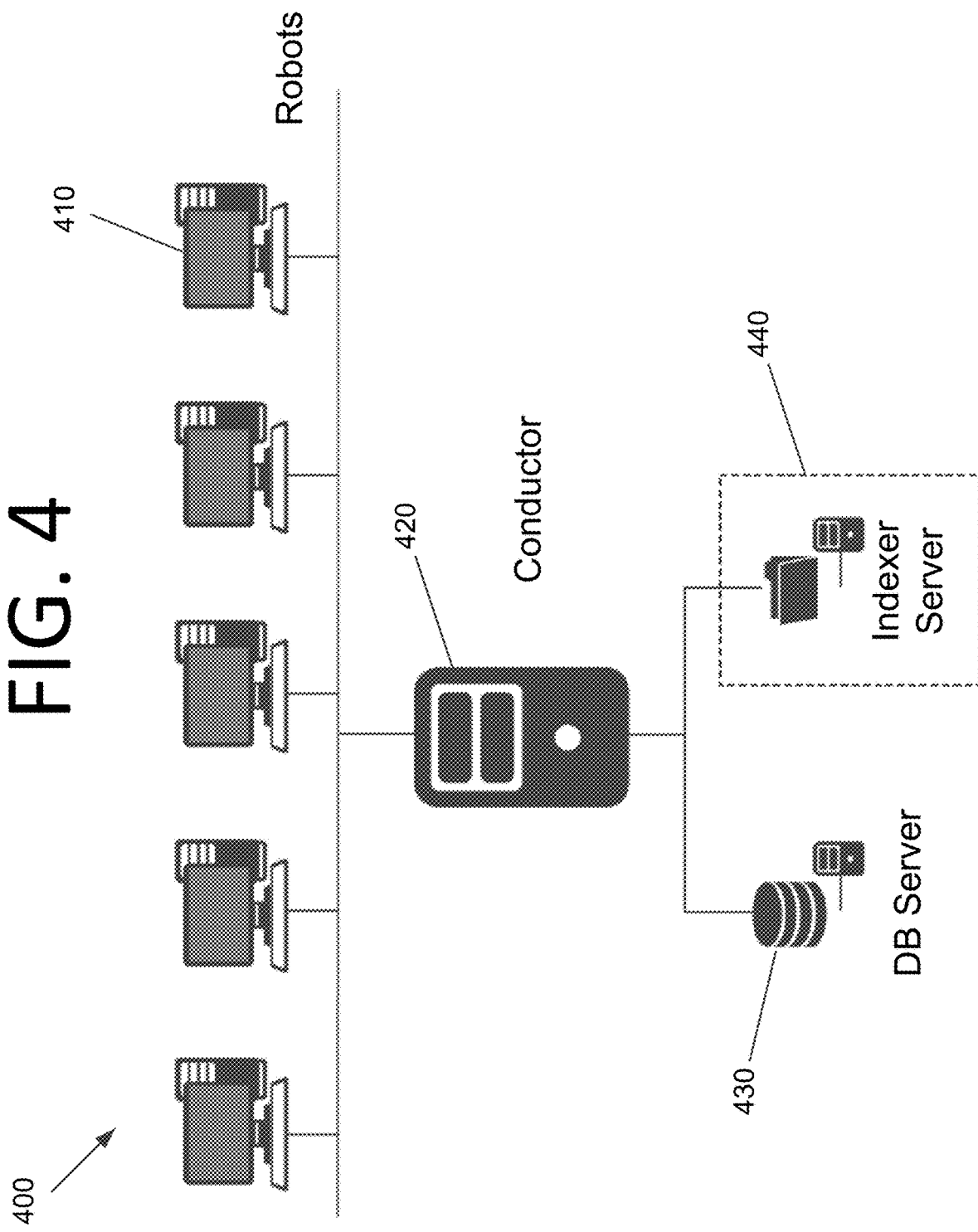
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
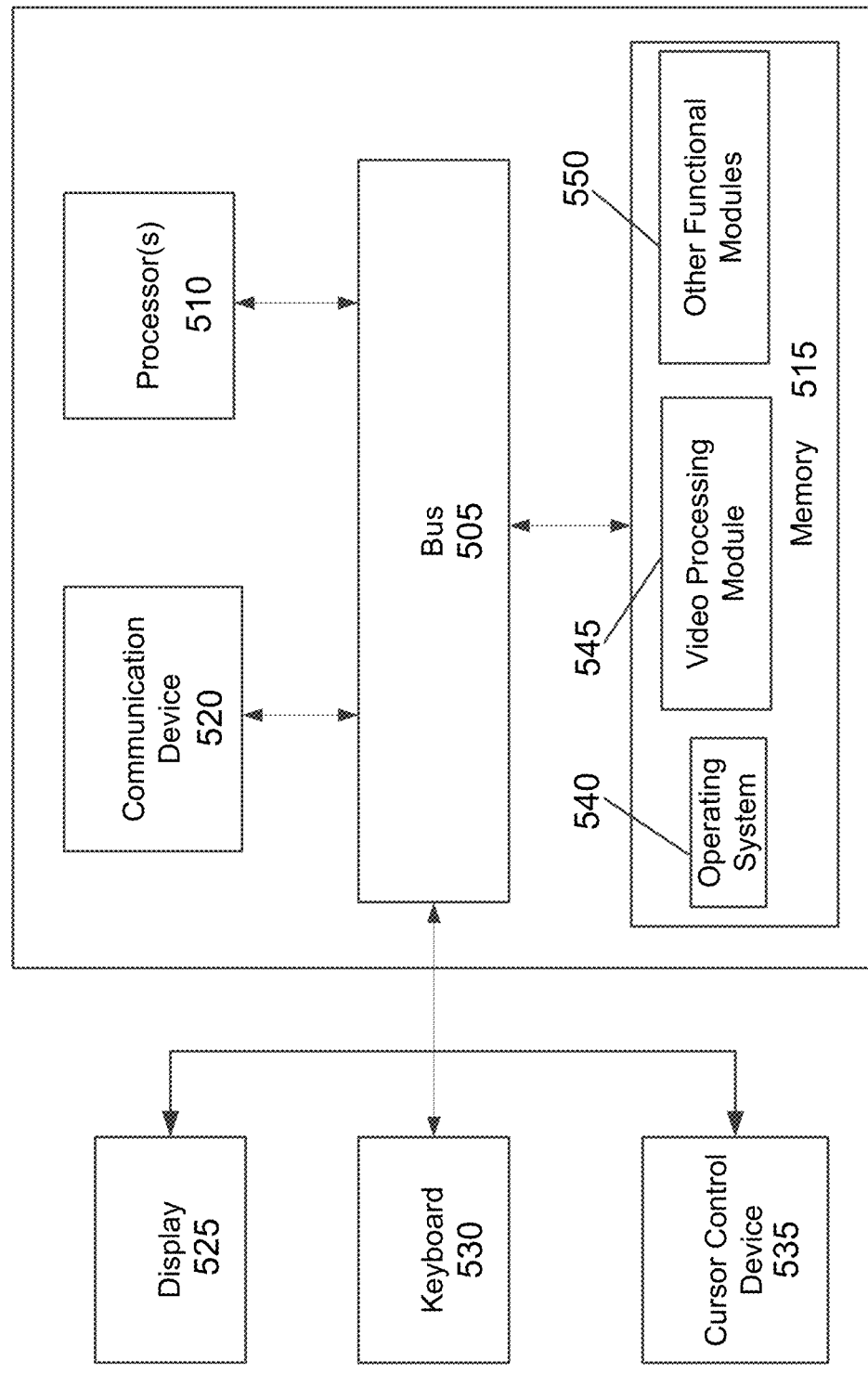
FIG. 5 is an architectural diagram illustrating a computing system configured to perform detection of typed and/or pasted text, caret tracking, and active element detection, according to an embodiment of the present invention.

FIG. 5 is an architectural diagram illustrating a computing system 500 configured to perform detection of typed and/or pasted text, caret tracking, and active element detection, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a video processing module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
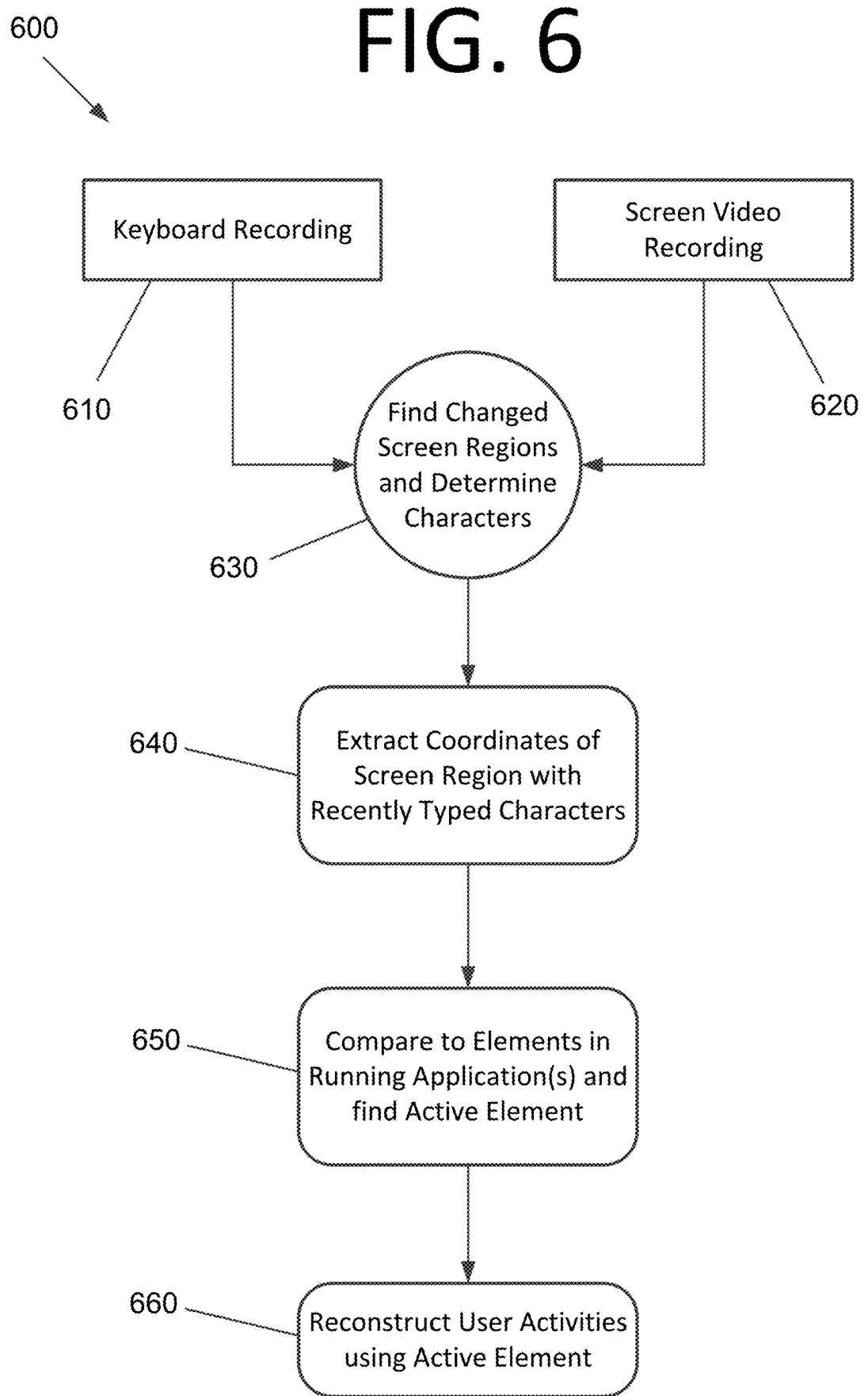
FIG. 6 is an architectural diagram illustrating a general process for performing typed text detection, caret tracking, and active element detection, according to an embodiment of the present invention.

FIG. 6 is an architectural diagram illustrating a general process 600 for performing typed text detection, caret tracking, and active element detection, according to an embodiment of the present invention. Keyboard recording 610 and screen video recording 620 are performed to determine the keys that were pressed and the location(s) on the screen where graphical changes occurred, respectively. In some embodiments, pasting of text may be monitored. See FIGS. 13A and 13B, for example. Keyboard recording 610 may be performed by monitoring key press events from the operating system. For instance, in Windows®, this may be the low level hooking delegate previously defined by registering a low level keyboard hook (WH_KEYBOARD_LL=13) via user32.dll method "SetWindowsHookEx". However, any key press event or functionality providing key press information for any programming language and any operating system (e.g., mobile, PC, Mac, etc.) may be used without deviating from the scope of the invention. In some embodiments, key presses may be detected via hardware. For instance, a universal serial bus (USB) device may be placed between the computing system and the external keyboard. Additionally or alternatively, video capture and processing may be performed via hardware in certain embodiments. In such embodiments, a first device may capture the video, a second device may capture the key presses, and a third device (e.g., a computing system) may process the video and key presses.

The key press event may include information regarding which character is associated with the key that was pressed (e.g., the letter "a", the number "2", the "%" sign, etc.), the time that the key press event occurred, etc. A queue of key characters (e.g., a first in-first out (FIFO) queue) may be stored for a time window (e.g., 500 milliseconds (ms), one second, etc.) to account for delays between when a key was pressed and when the corresponding character appears on the screen. The time window is usually longer than the typical time delay between when a user presses a key and when the key appears on the screen (e.g., a 50 ms character appearance delay and a 500 ms buffer window).

The queue may also serve the purpose of capturing multiple characters that appear on the screen all at once. For instance, if the user presses "abc" in vary rapid succession (e.g., within 15 ms), but only 25 frames per second are captured (i.e., one frame every 40 ms), the text "abc" may appear all at once in the next screenshot. By having "a", "b", and "c" in the queue, the algorithm may search for each of these characters and/or their sequences when text recognition finds these characters and/or sequences. For instance, in some embodiments, if the user types "abc" and "ab" appears in the next frame, it may be assumed that the order in the key press queue is the same as what appears on the screen.

Screen video recording 620 may be performed by any suitable hardware, software, or any combination thereof without deviating from the scope of the invention. For instance, video recording may be performed by an external video camera, an internal graphics card, a remote computing system monitoring a video stream from the display (via a connected computing system or not), etc. The recorded screenshots may be stored in any desired format, whether pixel perfect or not (e.g., JPEG, BMP, PNG, etc.).

In one implementation, screenshots are stored as Bitmap-Data in 16-bit color depth in Format16bppRgb555 format. Compressing screenshots to a lossy format may reduce accuracy since changes in one or more pixels may change a color map that is propagated to the entire image in some formats, affect the color depth, decrease/shift the overall detail, or affect image pixels by the existence of compression artifacts (e.g., in JPEG format). To accommodate for this, tolerances may be used. Screen video recording 620 produces frames at a certain frame rate, which may vary depending on current processing load of the computing system (e.g., 30 frames per second).

The current screenshot frame and the immediately previous frame are then compared to one another to determine differences therebetween and characters therein are determined at 630. However, in certain embodiments, multiple frames may be used to further increase accuracy. For instance, if there is varying desynchronization between when a character is typed and when it appears on the screen (e.g., varying from 30 ms to 42 ms to 24 ms, etc.), using multiple frames may assist in identifying typed text. This may allow OCR to be applied to a wider extracted region that could contain an entire word rather than one or a few characters. Some OCR engines are better tuned to recognize words than characters. By applying autocorrection to the OCR result, inaccuracies that may occur when applying OCR to individual characters only may be eliminated. For instance, the autocorrect algorithm may determine that the OCR word "slpck" should be "slack", which is found in the keyboard queue.

Location(s) of the visual changes may then be isolated, and an algorithm is run on the location where the change occurred to recognize characters. This algorithm may use OCR, pixel region comparisons against Boolean array maps of characters in certain fonts, etc. In some embodiments, character recognition is only run on the relatively small regions where changes occurred are isolated and analyzed, and the remaining regions are discarded. This helps to ensure that the algorithm can run in real time on computing systems where running OCR on the entire screen (e.g., a 3840×2160 pixel resolution) may be too computationally expensive for the computing system to keep up with the speed at which characters appear on the screen. However, for computing systems that have sufficient processing power, the entire screen may be analyzed without parsing out regions where no change occurred first.

Per the above, in certain embodiments, rather than being pixel perfect, video frame comparison computations use a tolerance. Color intensities, brightness, and/or other factors may be considered the same if they fall within a certain tolerance. For instance, pixels may be considered to be the same if changes in one or more of their values are less than a certain number, a certain percentage, etc. A change in red, green, blue, and brightness by less than 5, less than 1%, etc. may be considered to be the same. In certain embodiments, one or more of these variables may have different tolerances. For instance, perhaps brightness changes may need to be larger or smaller than color changes to be indicative of true pixel changes. Fuzzy image matching may be performed in certain embodiments to identify similarities/differences.

In some embodiments, fuzzy image matching takes into account brightness, image templates, edge comparisons, binarization, downscale and bit reduction, dilation, applies kernel blurring, a combination thereof, etc., to more accurately identify matches. Pixel-to-pixel RGB matching that applies a tolerance to RGB values may be used so close values that are not exactly the same may be identified as matches. Bit depth and/or color scale may be reduced and pixel-to-pixel RGB or grayscale matching may be applied. Edges from images may be detected and compared. Binarization may be applied to images (e.g., binary threshold, Otsu threshold, adaptive threshold, etc.) and pixel-to-pixel matching may be applied on binary images. The scale of images may be reduced and pixel-to-pixel matching may be performed. Dilatation of images may be performed and pixel-to-pixel matching may then be applied. Key points may be extracted from images (e.g., maximally stable extremal region (MSER) descriptors) and the extracted key points may be compared using feature matchers (e.g., brute force matching, k-nearest neighbors (kNN) matching, etc.).

There are various reasons that tolerance-based computations may be beneficial. For instance, if the image is compressed after a frame is captured, tolerance should be involved in the computations since lossy compression can affect pixel values. Also, original visual source may be compressed before capture using lossy compression (e.g., when a virtual computing system is launched via an emulator and the emulator compresses the virtual computer screen content). This may occur because the images are broadcast from a remote machine (e.g., a server) to the local computing system.

Once the characters of the screen region(s) where changes occurred are identified at 630, the characters are compared against the queue of stored characters corresponding with key press events. If a match is found, the screen coordinates of the match location are extracted at 640. However, in some cases, the character recognition algorithm may fail to recognize a character on the screen for what it actually is. For instance, the OCR algorithm may recognize the letter "O" on the screen as the number "0". In that case, in some embodiments, the algorithm tracks the location of the caret on the screen. This may be determined by comparing image patterns of various caret shapes to the screen, using image detection (e.g., CV), etc. In some embodiments, the algorithm may account for a caret blinking, if it does so.

In certain embodiments, fuzzy matching may be used to compare OCR results to characters in the queue. Fuzzy matching logic may recognize that the letter "O" looks similar to the number "0" and may identify these characters as a match. If there are no other similar characters in the queue, the match may be confirmed.

In certain embodiments, caret tracking is performed. Analysis of the changed region(s) of the image may be performed to create a list of candidates that may correspond to the caret (e.g., the candidates appear as a thin vertical line or something similar). Validation may be performed to identify that a candidate is blinking over time, and the true caret may then be identified. Further validation may be performed to verify that the caret appears within a graphical element capable of text entry (e.g., a text box, a word processor document, a text field, etc.).

If no changes occurred elsewhere on the screen, or other changes match characters in the queue besides the one that is missing, the algorithm may then infer that because this is the only unidentified change, it must be the missing character. The algorithm may then infer that the recognized letter "0" is actually an otherwise unidentified "0" in the character queue, for instance, and extract the screen coordinates of the match location at 640. This may improve the accuracy of the algorithm.

In some embodiments, characters may be removed from the queue when characters or a character sequence are found on the screen and uniquely identified, after a predetermined time elapses (e.g., 500 ms, one second, etc.), pop off characters at the end of the queue based on a queue of a predetermined size (e.g., 20 characters), etc. In order to remove characters falling outside a time window, the queue may store variables having the character that was typed and a time stamp. The algorithm may periodically compare the time stamps of key press variables in the queue (potentially beginning with the "first in" end) to the current time. If a key press variable is found in the queue that is older than the time window, the variable may be removed. In certain embodiments, once a key press variable is found that falls within the time window, it may be assumed that all other variables in the queue are within the time window, and processing may stop for that iteration.

After the coordinates of the screen region with the recently typed characters are extracted at 640, the coordinates are compared to running application(s) and the active element is determined based on which element the extracted coordinates fall under at 650. The active element may then be used to reconstruct individual user activities at 660 to learn processes that the user is performing (e.g., process extraction, process discovery, etc.). This may be executed in real time as the user is interacting with the computing system or performed later (e.g., video and keystrokes may be subsequently analyzed by a server). In some real time embodiments, video data may not be recorded and stored since frame differences may be calculated on the fly.

In some embodiments, the video recording, keyboard entry recording, and/or processing thereof are performed by an RPA robot. In certain embodiments, a recorder application records the user activity as screenshots or video and a series of key presses and saves this for later processing, or passes this information to another application running on the computing system or another computing system for real time or near-real time processing. CV may be applied immediately after processing of the video and key presses, or applied later, to provide a set of recognized graphical elements including their bounding rectangles. Then, if an intersection is found between a graphical element bounding rectangle and coordinates of caret/text, the particular element is currently active, or "focused."

In some cases, changes to the screen from one frame to the next may be substantial. For instance, when a user closes a window the majority of the screen may change. Therefore, in some embodiments, a change threshold is determined and applied to determine whether to compare time-adjacent screenshots at all (e.g., more than 2% of the screen changed, more than 5%, 10%, 30%, 50%, 70%, etc.). When this threshold is met or exceeded, the frame comparison process may be skipped until the difference between two time-adjacent frames is below the threshold.

Figure 7:
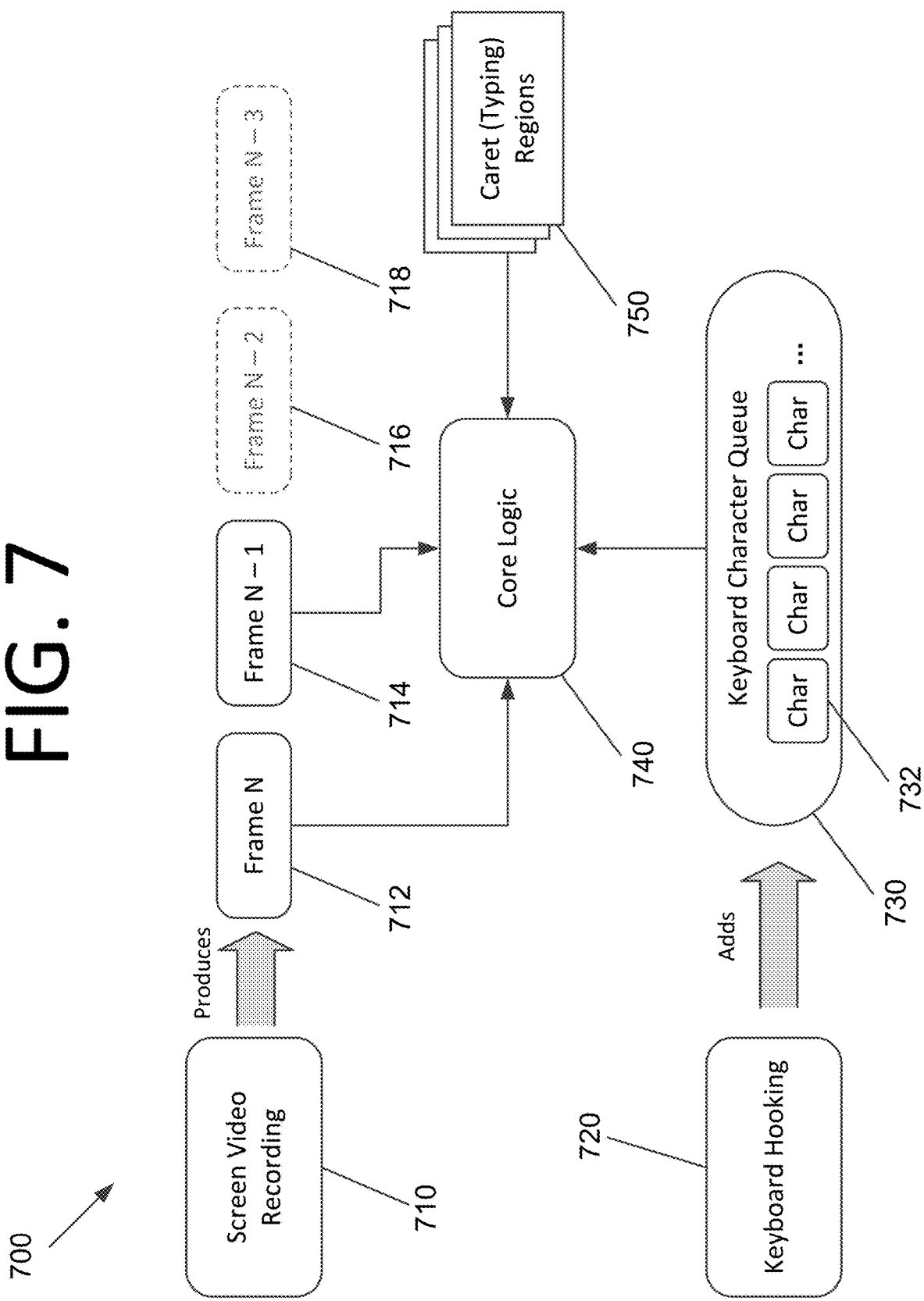
FIG. 7 is an architectural diagram illustrating a process for performing typed text detection and caret tracking, according to an embodiment of the present invention.

FIG. 7 is an architectural diagram illustrating a process 700 for performing typed text detection and caret tracking, according to an embodiment of the present invention. Screen video recording 710 is performed to produce video frames N 712, N−1 714, N−2 716, and N−3 718. Video frames may be the entire screen, a window associated with a running application, etc. In certain embodiments, frame sets for multiple running windowed applications may be stored and compared, or these frames may be pulled from screenshots. Keyboard hooking 720 is also performed to produce a time windowed keyboard character queue 730 including characters 732 associated with key presses. In some embodiments, characters are removed from the character queue when the key press associated therewith exceeds a predetermined age. In certain embodiments, characters are removed from the queue after they are found on the screen if unique. However, if not unique (e.g., the user presses "a a a a a" rapidly in succession), the oldest instance of "a" may be removed from the queue.

Core logic 740 receives the current frame and immediately previous frame (in this case, frames 712, 714), as well as the keyboard character queue. Core logic 740 may perform various logic described above with respect to FIG. 6. For instance, core logic 740 may compare frames 712, 714 to one another and determine region(s) therein where visual changes occurred. This may be determined by comparing whether red/green/blue (RGB) values of respective pixels exceed a threshold with respect to one another, for example.

Core logic 740 may isolate the location(s) of the visual changes and perform character recognition to recognize characters in the location(s). Core logic 740 may also match recognized characters to characters 732 in keyboard character queue 730. When matches are found, the screen coordinates of the match location may be extracted and provided as character typing regions 750.

Additionally or alternatively to using character recognition, in some embodiments, image recognition (e.g., CV) may be used to detect newly appearing or disappearing images or icons. The process may be otherwise the same as that described above, except with this replacement or supplemental logic at the region difference analysis stage. This may be useful for determining where a user is cutting-and-pasting images or text into a document or field, for example.

In the case of cutting-and-pasting text, when text is flushed from clipboards, the individual characters are not captured as key press events. In such a case, the content of the clipboard and the time when the user is pressing CTRL+V can be captured. The content of the clipboard can then be compared to the OCR results, similar to how individual characters and character sequences are identified. However, rather than reviewing the typed character queue, the algorithm would work with a string of characters that were stored in the clipboard before CTRL+V occurred.

Figure 8A:
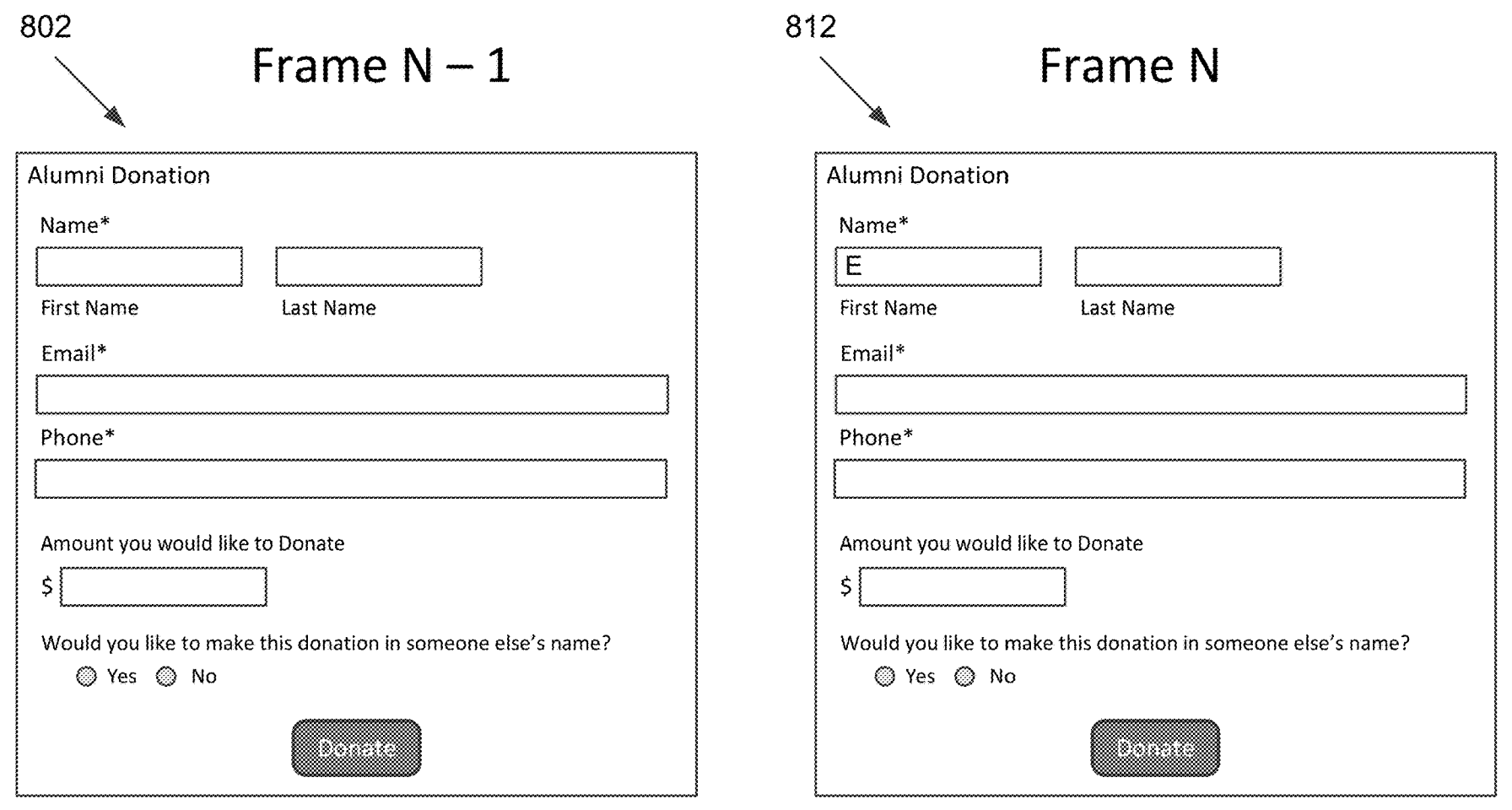
Figure 8B:
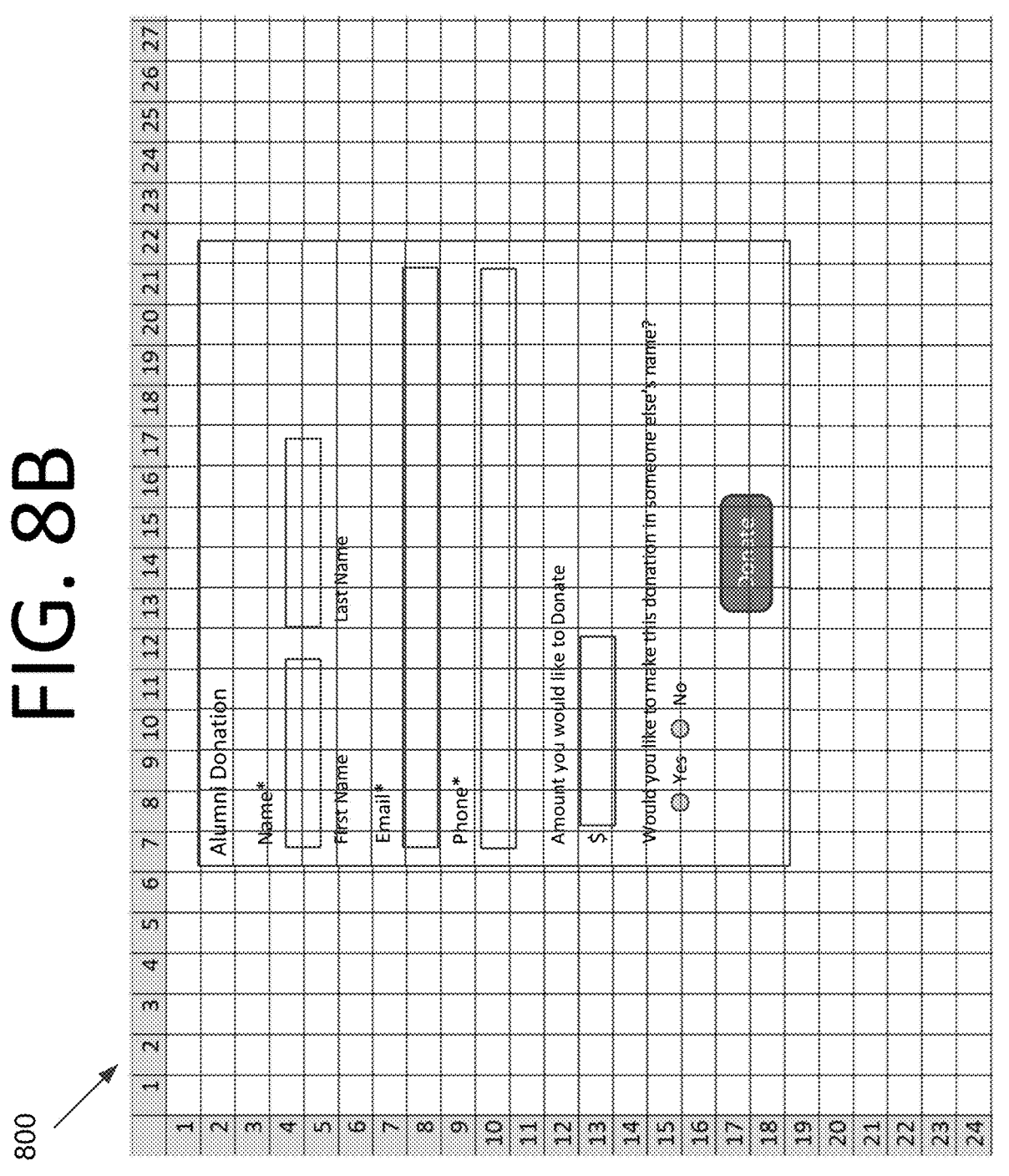
Figure 8C:
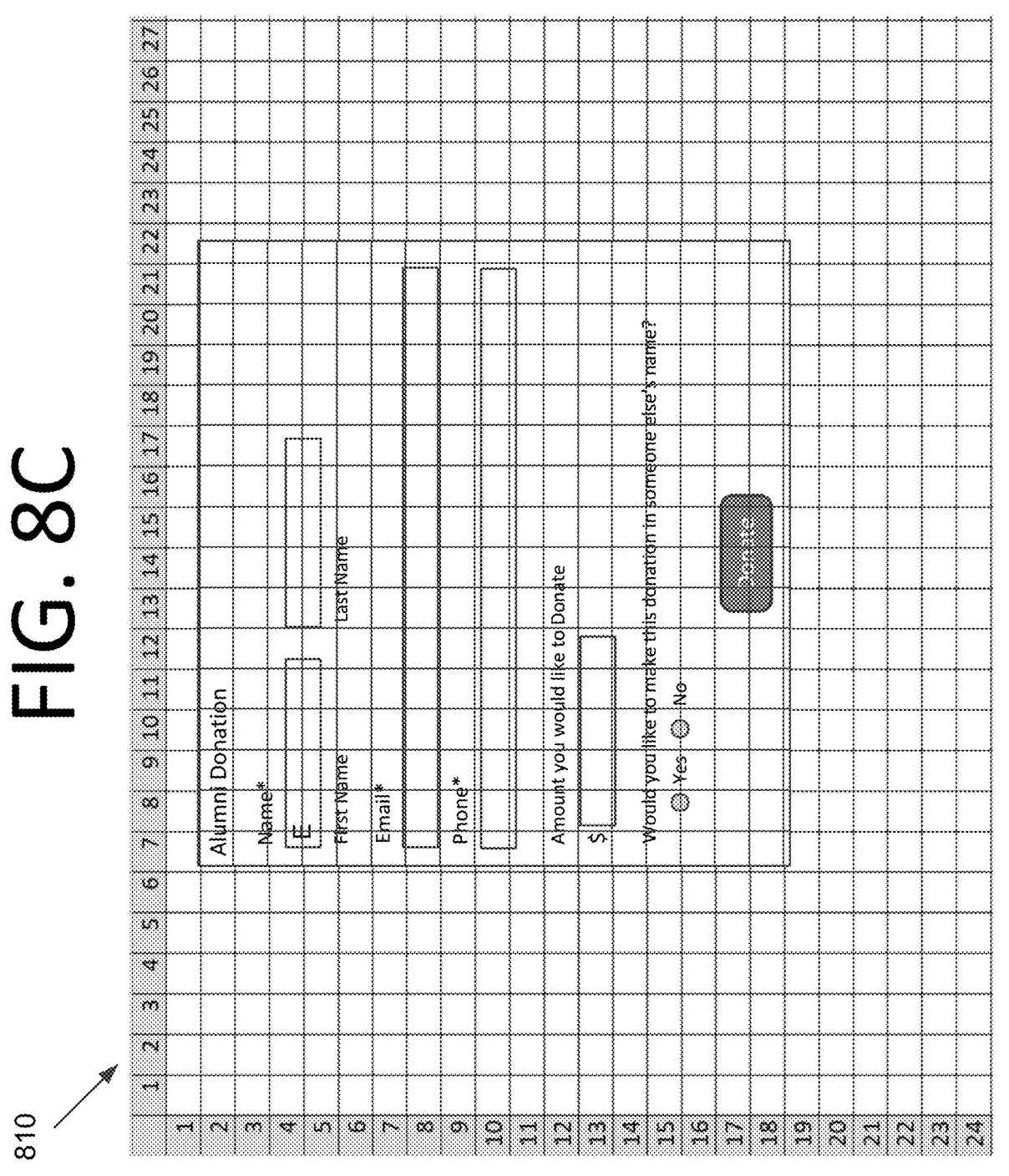

FIG. 8A illustrates portions 802, 812 of screenshots 800, 810 including an alumni donation window for frames N−1 and N, respectively, according to an embodiment of the present invention. As can be seen in FIG. 8A, all fields in frame N−1 are empty, but in frame N, the user has typed the letter "E" in the first name field. In order to determine whether changes have occurred, the algorithm of some embodiments scales the screenshots and normalizes them into squares. In this case, screenshot 800 (see FIG. 8B) and screenshot 810 (see FIG. 8C) are normalized into a grid of 64 squares by 48 squares, a 27×24 portion of which is shown in FIGS. 8B-F. These squares, or regions, may be represented as a 64×48 binary matrix.

Figure 8D:
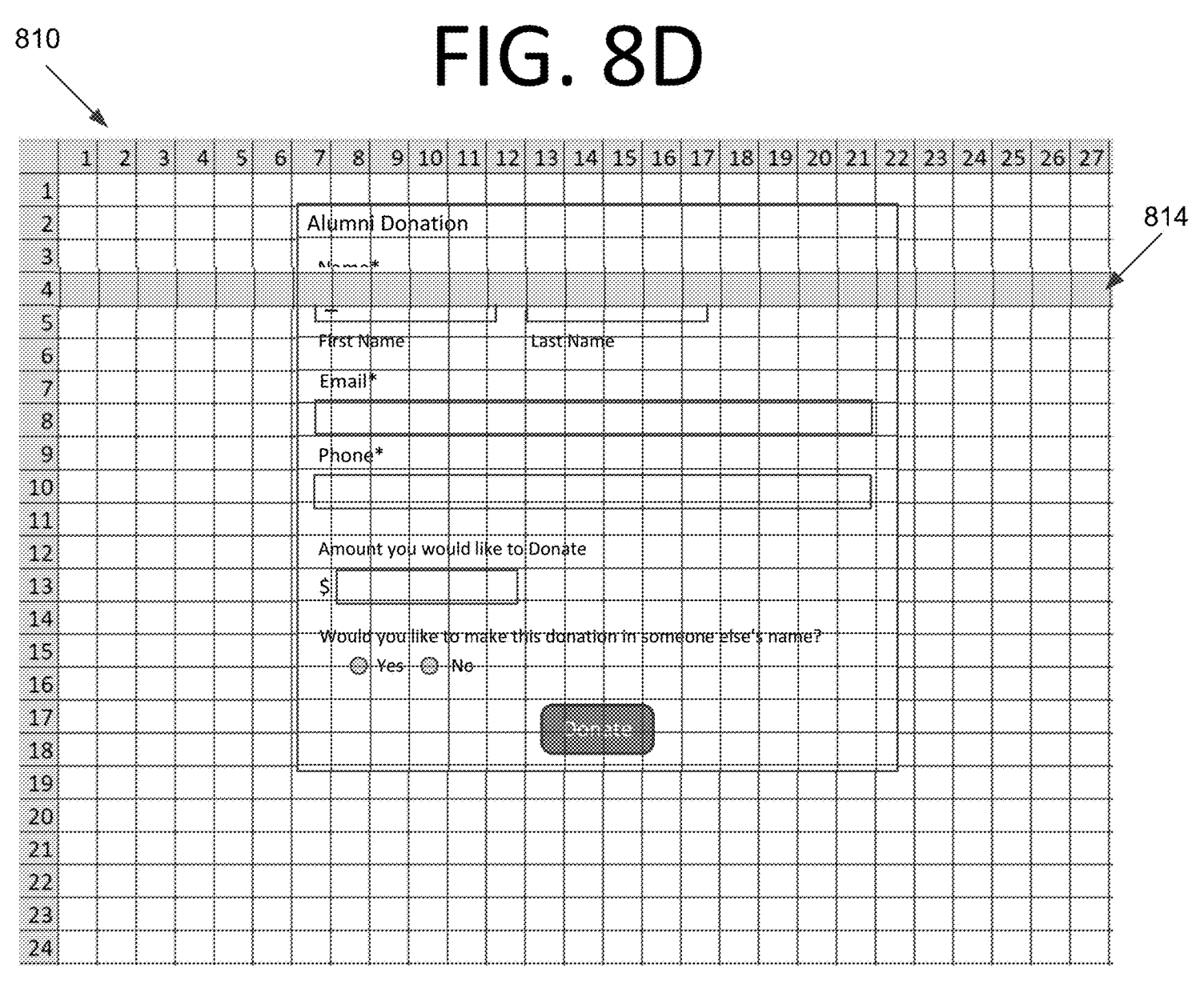
Figure 8E:
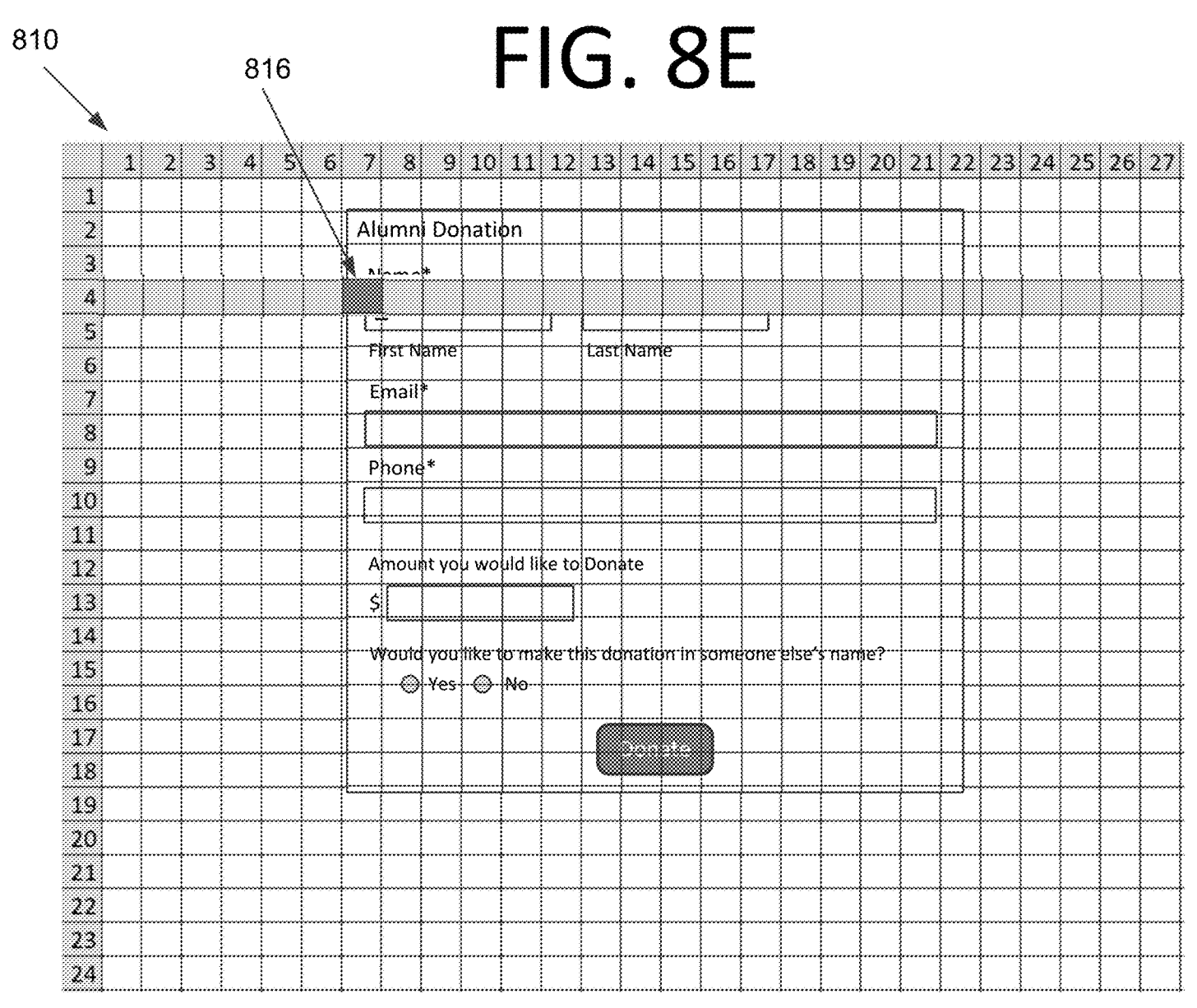
Figure 8F:
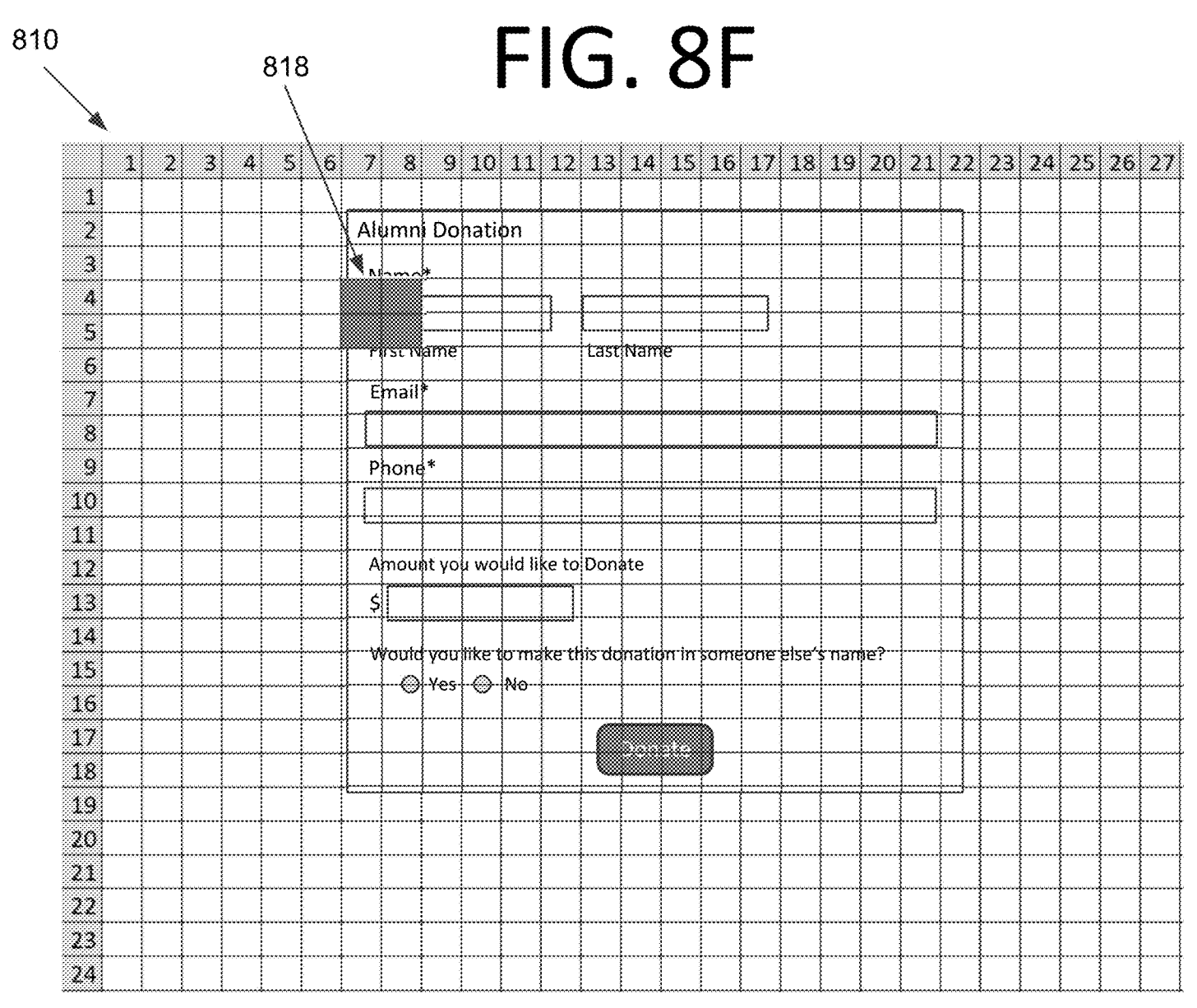

The row for each screenshot may then be compared to one another to see whether any pixels contained therein have changed, and the values of the matrix may be set to "1" for each row with a change. This may be done by checking whether a non-zero element exists in each row. As seen in FIG. 8D, when the algorithm checks row 4 of the matrix, designated 814 herein, a change is detected therein. The algorithm then steps into row 4, as seen in FIG. 8E, and the square denoted 816 in column 7 includes a portion of the newly entered letter "E". The algorithm continues to identify squares including changes and stitches together adjacent squares 818 as a region to be submitted for OCR to be run on this portion. See FIG. 8F. This is denoted a "region" herein. In some embodiments, if one or some squares making up the region do not have changes, these squares may be set to be entirely one color, for instance, to make OCR processing run faster. In certain embodiments, if sufficient processing resources are available, OCR may be run on the entire pair of screenshots to recognize text. Bounding boxes where text and the position are the same or similar between screenshots may be eliminated and the OCR region(s) that newly appear are identified. This identified text can be compared to the keyboard character queue to search for matches.

From time to time, users may change the display resolution, hook up an additional monitor, etc. Some embodiments detect and accommodate these changes so that the typed character tracking, caret tracking, and/or active element detection remains accurate. FIG. 9 is a flowchart illustrating a process 900 for checking for resolution changes, checking for changes in the range of connected displays, and setting up the caret tracking video logic to accommodate changes, according to an embodiment of the present invention. The process begins with checking one or more connected displays for a computing system at 910 and comparing the connected display(s) to previously connected display(s) at 920. This may involve checking whether a different display device is present, checking whether the resolution of the display device has changed, etc. In some embodiments, a "connected" display may be a display integrated with the computing system (e.g., as is normally the case with smart phones, laptop computers, etc.).

If the connected display device(s) and/or resolution have changed at 930, the resolution and scale is obtained for each connected display at 940. The screenshot area for screenshots that will be captured is set to the full display dimensions multiplied by the scale and aligned to multiples of a desired size (e.g., 8, 16, etc.) at 950. The multiples may facilitate dividing the screenshots into squares, as discussed in further detail later herein. The video logic for typed character tracking, caret tracking, and/or active element detection is then set (e.g., restarted, reinitialized, provided with the new display settings, etc.) at 960.

FIG. 10 is a flowchart illustrating a process 1000 for a video recorder, according to an embodiment of the present invention. The process begins with taking a screenshot at 1010. In some embodiments, this may be accomplished in C# using the Graphics Device Interface (GDI) CopyFromScreen( ) instruction for Windows®. The screenshot is then added as a frame to a buffer at 1020. This can be accomplished by adding the screenshot to the buffer as a Bitmap object in C#, for example. If the process is still running at 1030 (e.g., the process has not been stopped by closing the application, a screen resolution change, etc.), the screenshot capture may be repeated for the next screenshot.

It should be noted that while C# examples are provided, for process 1000 and the other processes disclosed herein, any suitable programming language, operating system, APIs, and functions may be used without deviating from the scope of the invention.

Figure 11:
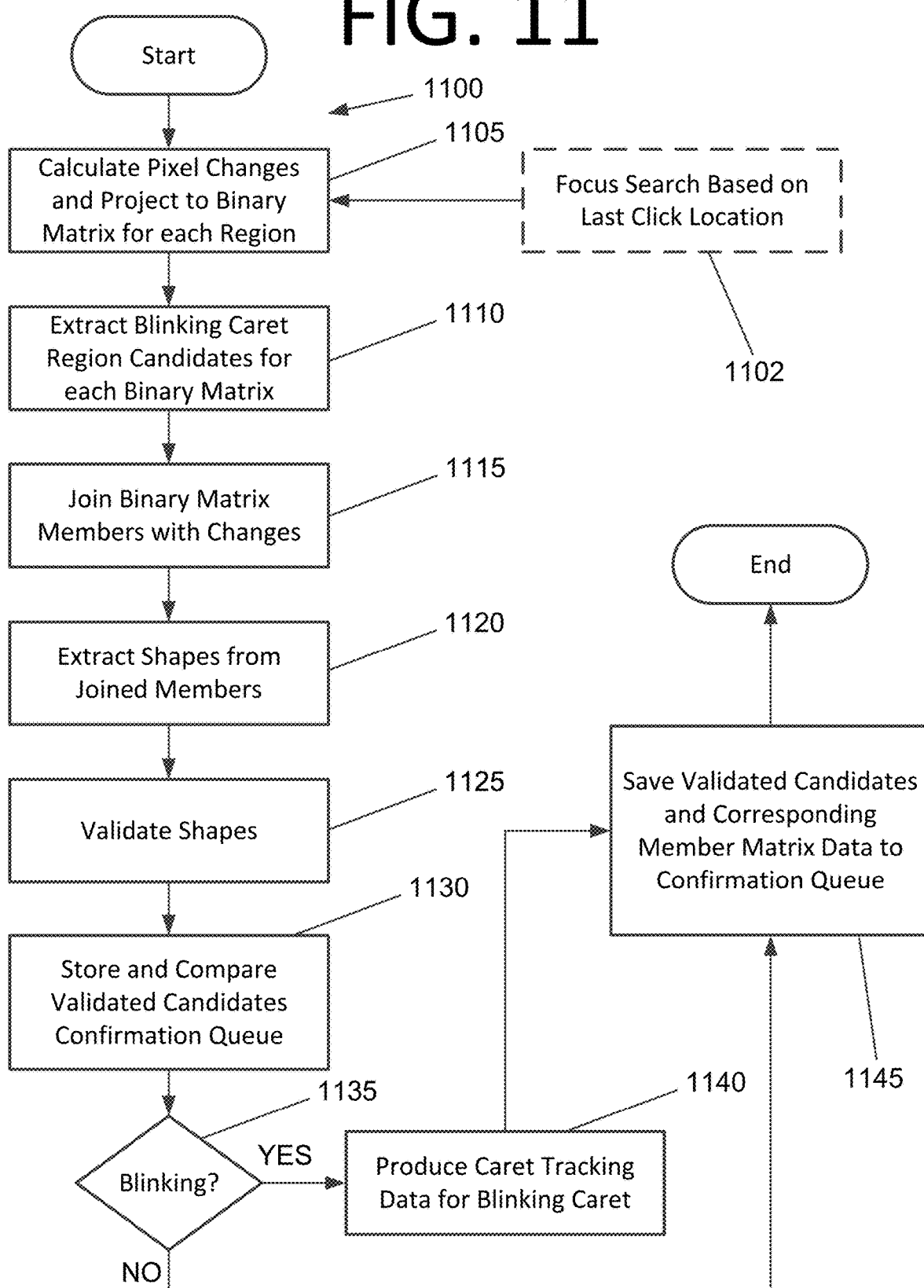
FIG. 11 is a flowchart illustrating a process for performing caret tracking, according to an embodiment of the present invention.
Figure 12A:
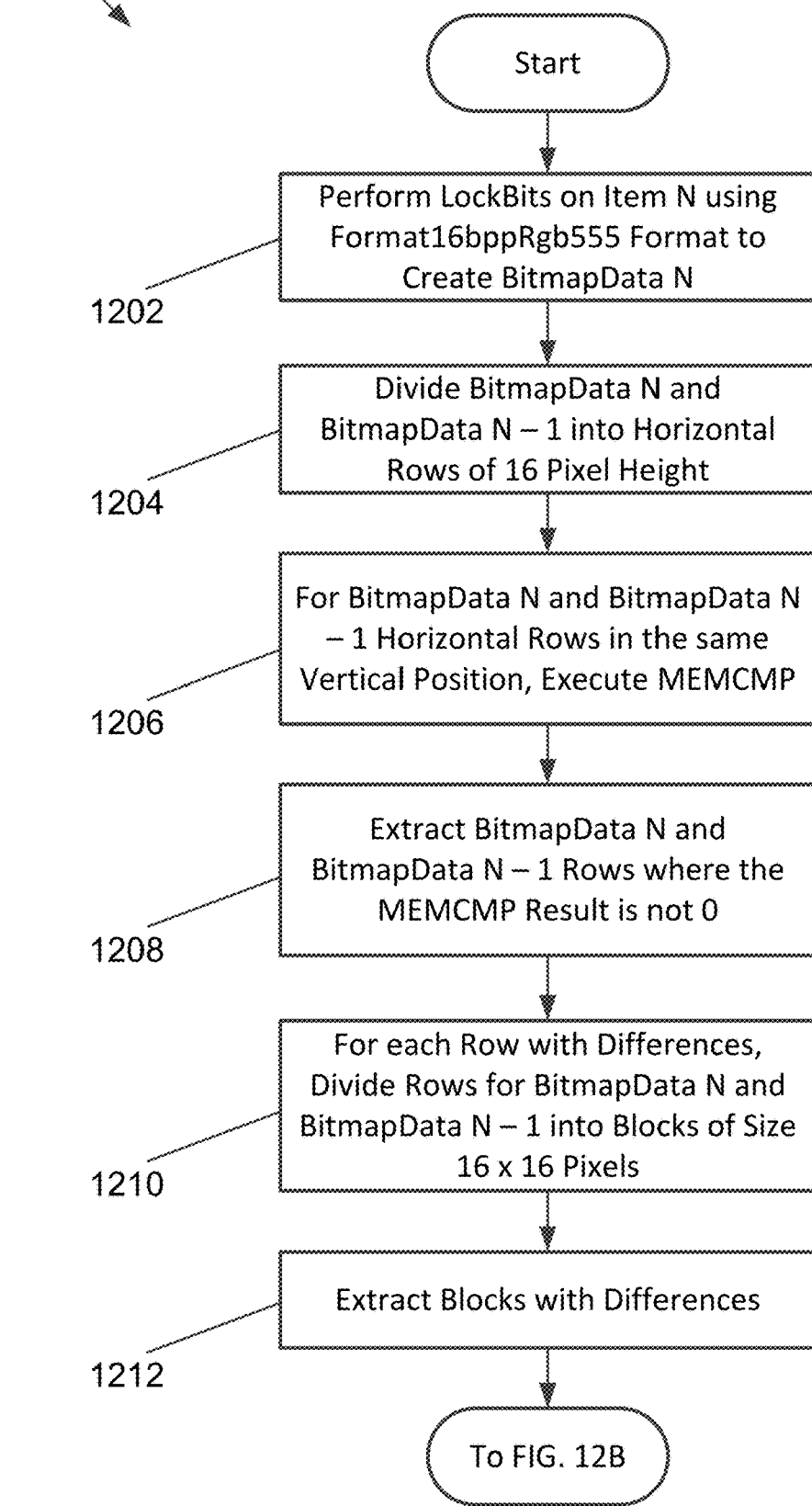

Some embodiments perform caret tracking to more accurately identify which element of a screen a user is focusing on. For instance, if a caret appears in a graphical element where text is appearing, it is likely that newly added text in the keyboard queue is what is appearing in this graphical element. FIG. 11 is a flowchart illustrating a process 1100 for performing caret tracking, according to an embodiment of the present invention. Typically, the caret will appear and start blinking at or near a location where the user most recently clicked. Accordingly, some embodiments store the coordinates of the last mouse click and search for the caret proximate to this location. This may reduce the amount of the screenshot that is processed to locate the caret and may further increase accuracy. In some embodiments, a history buffer of mouse clicks or the single most recent click location is used. In certain embodiments, if the user presses the tab key, for example, the system may assume that the caret may have moved to the next graphical element on the screen and may refocus the search to that location, if known, or else search the entire screenshot.

Pixel changes are calculated for each region in the screenshot where changes occurred, and the regions are projected to a binary matrix at 1105. The binary matrix is a representation of whether the pixels of a region have changed, and may include a "0" for pixels with no change between screenshots and a "1" for pixels that changed. A "region" is a square where changes occurred that may include multiple squares from the screenshot in some embodiments. However, any other suitable shape (e.g., a rectangle, a hexagon, etc.) may be use without deviating from the scope of the invention. In some embodiments, a fixed number of regions are supported for analysis, depending on the processing power of the computing system. For instance, some embodiments support extraction and OCR of two regions, three regions, ten regions, etc. Some embodiments may look for both the caret and typed or pasted text. When more than a number L of change regions is found between the current screenshot and the previous screenshot, the first L regions that were found may be processed or the screenshot may be ignored entirely. This may help to ignore screens where the user has launched a different window or a sufficient portion of the screen is otherwise changed such that OCR might not be completed in time before the next screenshot is captured.

For each binary matrix, blinking caret region candidates are extracted at 1110 and binary matrix members are joined at 1115. As used herein, "members" are connected shapes that are present in the binary matrix, such as shapes representing a letter, a cursor, etc. The joining of the matrix members may be performed using a Connected Components algorithm where components are 8-connected, for example. Connected Components are a set of pixels where each pixel is connected to all other pixels.

Shapes are extracted from the matrix member joining results at 1120 and the shapes are validated at 1125. The shape should typically be a perfect rectangle, for example, which can include a line. The validated shape candidates are stored and compared to a confirmation queue at 1130. The position, size, and shape of the caret candidates may be stored, along with a time stamp. The frequency with which a caret blinks should be consistent within a tolerance (e.g., 5%). Since the caret blinks, the candidates should be stored for analysis to see whether they match the expected properties of the caret (i.e., position, size, and frequency). This can help to determine whether the caret candidate is blinking with a certain frequency when compared across multiple screenshots (e.g., 20). This information may also help to identify the caret if it reappears elsewhere after the user clicks the mouse on a new field, presses the tab key, etc. Naturally, at the beginning of the process, the confirmation queue is empty.

If a given caret candidate is confirmed to be blinking at 1135 based on the appearance/disappearance of the caret candidate, the size, and the position, caret tracking data is produced for the blinking caret at 1140. This may include the position of the caret on the screen, the graphical element in which it resides (i.e., the active element), etc. The validated candidate regions and the corresponding member binary matrix data are then saved to the confirmation queue at 1145 for later validation, for instance. The process of FIG. 11 may be repeated for each new screenshot in some embodiments.

FIGS. 12A-D are flowcharts illustrating a process 1200 for performing video processing for typed character tracking, caret tracking, and active element detection, according to an embodiment of the present invention. Prior to process 1200, a check may be made for resolution changes and the caret tracking video logic may be set up to accommodate changes. See FIG. 9, for example. In certain embodiments, process 1200 may run concurrently with a video recorder. See FIG. 10, for example. Process 1200 is an example using C# and the Windows® operating system. However, any suitable programming language, operating system, associated APIs, formats, and functions may be used without deviating from the scope of the invention.

The process begins with performing LockBits on video item N (e.g., a screenshot, a portion of a screen, an application window, etc.) using the format Format16bppRgb555 for create a BitmapData object for N at 1202. LockBits locks a rectangular portion of a bitmap and provides a temporary buffer that can be used to read or write pixel data in a specified format. BitmapData stores attributes of a bitmap.

BitmapData N and BitmapData N−1 (i.e., the BitmapData object for the previous item) are then divided into horizontal rows with a height of 16 pixels at 1204. However, any desired height (e.g., 8 pixels, 32 pixels, etc.) for this step and other steps of process 1200 may be used without deviating from the scope of the invention. For each horizontal row of BitmapData N and BitmapData N−1 in the same vertical position (i.e., in the same "row"—see FIGS. 8A-F), a MPCMP instruction is executed at 1206, which performs fast comparison of byte arrays. MEMCMP provides an indication of whether the rows are the same.

Horizontal rows for BitmapData N and BitmapData N−1 in the same row where the MEMCMP result is not equal to 0 are then extracted at 1208, and the extracted horizontal rows are then divided into size 16×16 pixels at 1210. See FIG. 8C, for example. For each 16×16 pixel block of BitmapData N and BitmapData N—1, blocks where a difference between them are then extracted at 1212. See FIG. 8F, for example. This may be performed using a combination of long XOR functions looping Intel Intrinsics® instructions or some other suitable capability.

Per the above, in some embodiments, the number of regions that can be processed is limited to a predetermined number L. In certain embodiments, the number of blocks that can be included in each region may be limited. For instance, a limit of 4 squares, 9 squares, 16 squares, etc. may be imposed to ensure that OCR can be run on each region before the next screenshot is obtained. This may be an "optimization threshold", which can include a limit on the number of regions that have changed, a limit on the number of squares contained in a given changed region, or both.

The total count of extracted 16×16 pixel blocks in each region, the number of regions, or both, are compared to the optimization threshold at 1214. If the optimization threshold is met at 1214, the process proceeds to step 1246 and on to the next screen capture. If the threshold is not exceeded at step 1214, proximate 16×16 pixel blocks are joined at 1216 using a Connected Components algorithm, which may be an 8-connected Connected Components algorithm in some embodiments. This determines which blocks are neighbors.

Once the connected neighbors are determined, a bounding rectangle for each set of proximate blocks is determined at 1218, forming a region. This may be determined by an extremal algorithm where the blocks having the highest and lowest x-values (i.e., the leftmost and rightmost block(s)) and the highest and lowest y-values (i.e., the uppermost and lowest block(s)) are included. Such an example can be seen in FIG. 8F.

Figure 14A:
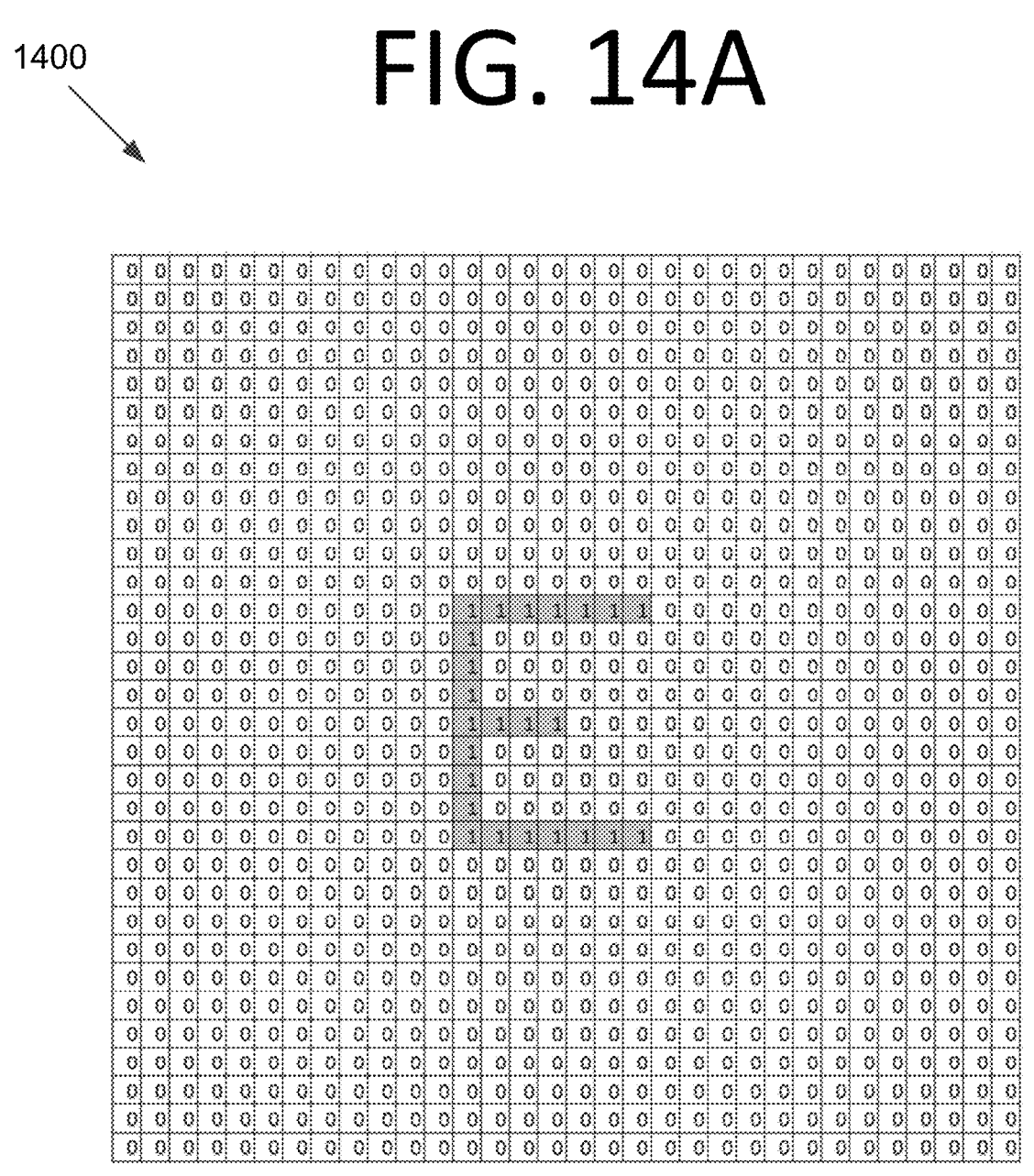

For each bounding rectangle for a region, pixel changes are calculated and projected to a binary matrix at 1220. An example binary matrix 1400 for the letter "E" included in four 16×16 blocks that have been combined into a 32×32 region is shown in FIG. 14A, for example.

In most cases, the region will be larger than the member(s) contained therein (e.g., letters, caret, other shapes that changed the pixels, etc.). In order to increase the speed of the OCR algorithm, for each binary matrix, the member(s) included in each region are determined (e.g., using a Connected Components algorithm) and the binary matrix is cropped for each member at 1222. This produces cropped matrices for each member in each region. An example cropped member matrix 1410 for the letter "E" produced from binary matrix 1400 is shown in FIG. 14B. The cropping may also be performed using an extremal algorithm in some embodiments.

Blinking caret region candidates are then extracted from the member matrices at 1224. For example, candidates may have a rectangular shape, which potentially includes a vertical line with a width of a single pixel in some embodiments. The extracted blinking caret region candidates and the corresponding member matrix data is then compared to a confirmation queue at 1226, potentially analyzing size, location, and frequency of blinking. If blinking at 1228, caret tracking data is produced for the blinking caret at 1230. Blinking caret regions and their corresponding member matrix data are then saved to the confirmation queue at 1232. In some embodiments, this portion of process 1200 may be the same as or similar to process 1100 of FIG. 11.

The member binary matrices only indicate whether a given pixel has changed from screen capture N−1 to screen capture N. Accordingly, the pixel data is retrieved from BitmapData N for each pixel that has changed at 1234. Member rectangles are then generated and prepared for OCR at 1236. This may include populating pixel data for each changed pixel, eliminating caret pixels, processing the background (e.g., setting unchanged pixels to null or a highly contracting value), etc. In the case where the caret pixels were eliminated, it can be assumed that the caret itself was detected at this time with a certain position, shape, and set of binary matrix members. This information can be stored for caret tracking purposes. OCR is then performed for the prepared member rectangle pixel data at 1238, and fuzzy matching to the keyboard queue is performed for each OCR result at 1240. Typed text tracking data is produced for the matched OCR regions at 1242.

Once located, keyboard queue items that matched OCR regions are removed from the keyboard queue at 1244. Where multiple instances of a character exist, the oldest instance of that character in the keyboard queue may be removed, for example. UnlockBits is then performed on BitmapData N−1 at 1246, which unlocks this bitmap from system memory, and BitmapData N is moved to position N−1 at 1248. Process 1200 can then return to the start for the next captured item.

FIGS. 13A and 13B are flowcharts illustrating a process 1300 for performing pasted text tracking, according to an embodiment of the present invention. The process begins with performing keyboard recording at 1305 and screen video recording at 1310 to determine the keys that were pressed and the location(s) on the screen where graphical changes occurred, respectively. A user gesture is then interpreted at 1315. User gestures may include, but are not limited to, mouse clicks, pressing CTRL+V, right clicking plus selecting paste from a menu, clicking a home button and pasting in an application, etc. If a user clicks a location and pastes from the clipboard quickly, the caret may be missed and the user's actions may need to be reconstructed differently. If a paste from the clipboard did not occur at 1320, typed text detection and caret tracking logic is performed at 1325, potentially along the lines of process 1200 of FIGS. 12A-D in some embodiments.

However, if the clipboard includes recently pasted data from the user at 1320 (e.g., pasted within the last 500 ms, the last second, etc.), pixel differences between frames N and N−1 are calculated at 1330. Predicted same position regions where changes occurred between frames N and N−1 are then extracted at 1335. For each region, pixel changes are calculated and the changes are projected to a binary matrix at 1340.

For each binary matrix, members are determined using a Connected Components algorithm, for example, and member matrices are determined for each member at 1345. Pixel data is extracted for each changed pixel in the member matrices and member rectangles are generated at 1350. Each member rectangle is prepared for OCR at 1355 and OCR is run on each prepared member rectangle at 1360. A fuzzy matching comparison of the OCR results to the clipboard content is performed for each OCR result at 1365 using clipboard content provided by a clipboard monitor at 1370. In some embodiments, clipboard text content be obtained from System.Windows.Forms.dll using Clipboard.GetText( ). If a match is found at 1375, the coordinates of the pasted text (e.g., in the form of a rectangle) are produced and the clipboard is flushed at 1380 and the process returns to steps 1305 and 1310 for the next frame.

In some embodiments, the current active element may be saved for the case where a user presses a certain key that causes a screen change. For instance, if the user presses the enter key, it may cause a form to submit and a window to close out. In another example, if a user presses enter in a URL input field for a web browser, this may cause the web browser to start navigating to a website. The algorithm may recognize this and wait for a certain amount of time before it looks where the active element is in these scenarios since significant screen changes are likely to be occurring. Once the screen becomes relatively static (e.g., only a relatively small portion of the screen changes from one screenshot to the next), the typed text detection and caret tracking may resume again to find the new active element. It may thus be helpful to know which element was focused when the user pressed enter, escape, etc. Also, if the current operating system provides a reliable way to natively obtain the window bounding rectangle of the current foreground window (e.g., the "GetForegroundWindow" available in user32.dll in Windows®), the foreground window bounding rectangle may be used to limit the area that will be used for screen capturing and frame processing.

In some embodiments, if the focused or active element is determined, behavior from pressing keys that do not cause text to appear (e.g., enter, escape, control, a combination of control and/or alt and one or more characters, etc.) may be determined based on the nature of the active element. For instance, when such a "hot key" (invisible key or combination of keys) is pressed, the action that the "hot key" has triggered can be classified. For instance, if the focused element is labeled "Password" and the user presses "Enter", it can be inferred that pressing "Enter" represents a "Login" action. This may be useful for the purpose of process discovery, where knowing that the user performed a "Login" is more descriptive for the purpose of business process modeling than just knowing that the user has pressed "Enter".

In some embodiments, CV may be used to determine the types and locations of the graphical elements in a screen to more readily determine the active elements. For instance, CV may be used to determine whether a given graphical element is a text field, a text box, etc. If the screen changes a relatively small amount, or changes are localized within a graphical element, it may be assumed that the changes correspond with newly appearing text in a given frame.

Figure 15:
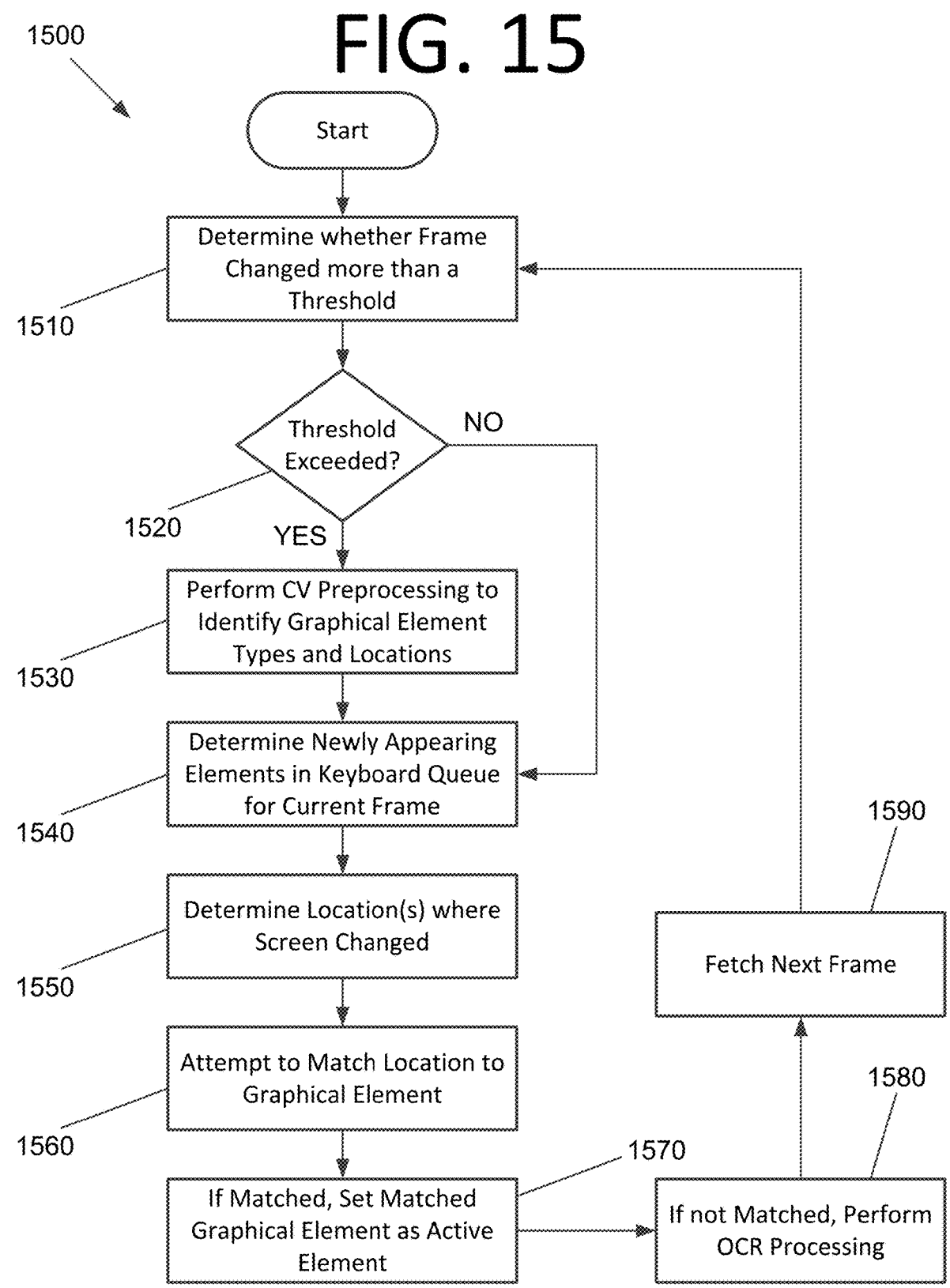
FIG. 15 is a flowchart illustrating a process for using CV and a keyboard queue to determine active elements, according to an embodiment of the present invention.

FIG. 15 is a flowchart illustrating a process 1500 for using CV and a keyboard queue to determine active elements, according to an embodiment of the present invention. The process begins with determining whether a frame changed from the previous frame by more than a predetermined threshold at 1510. This may include checking whether more than a certain portion of the frame has changed (e.g., more than 2%), whether more than a predetermined number of pixels has changed (e.g., more than 200), whether changes occur outside of locations of graphical elements in the frame that permit text entry, etc.

If the threshold is exceeded at 1520, it is likely that at least some of the graphical elements on the screen have also changed. CV preprocessing is performed at 1530 to identify graphical element types and locations, which may be stored in memory. The frame comparison process may be paused while the CV preprocessing is performed in some embodiments.

If the threshold was not exceeded at 1520, or after CV preprocessing is completed at 1530, newly appearing elements in the keyboard queue added between the previous frame and the current frame are determined at 1540. If there are newly appearing elements in the keyboard queue, it may be assumed that these appeared in a suitable graphical element on the screen. Location(s) where the screen changed in the current frame are then determined at 1550 and an attempt is made to match changes to locations of the graphical elements at 1560. If changes occurred within only one of the graphical elements, the matched graphical element is set as the active element at 1570. However, if changes occurred within multiple graphical elements or no changes were found in a graphical element, OCR-based processing is performed at 1580. The next frame is then fetched at 1590 and the process repeats.

Figure 16:
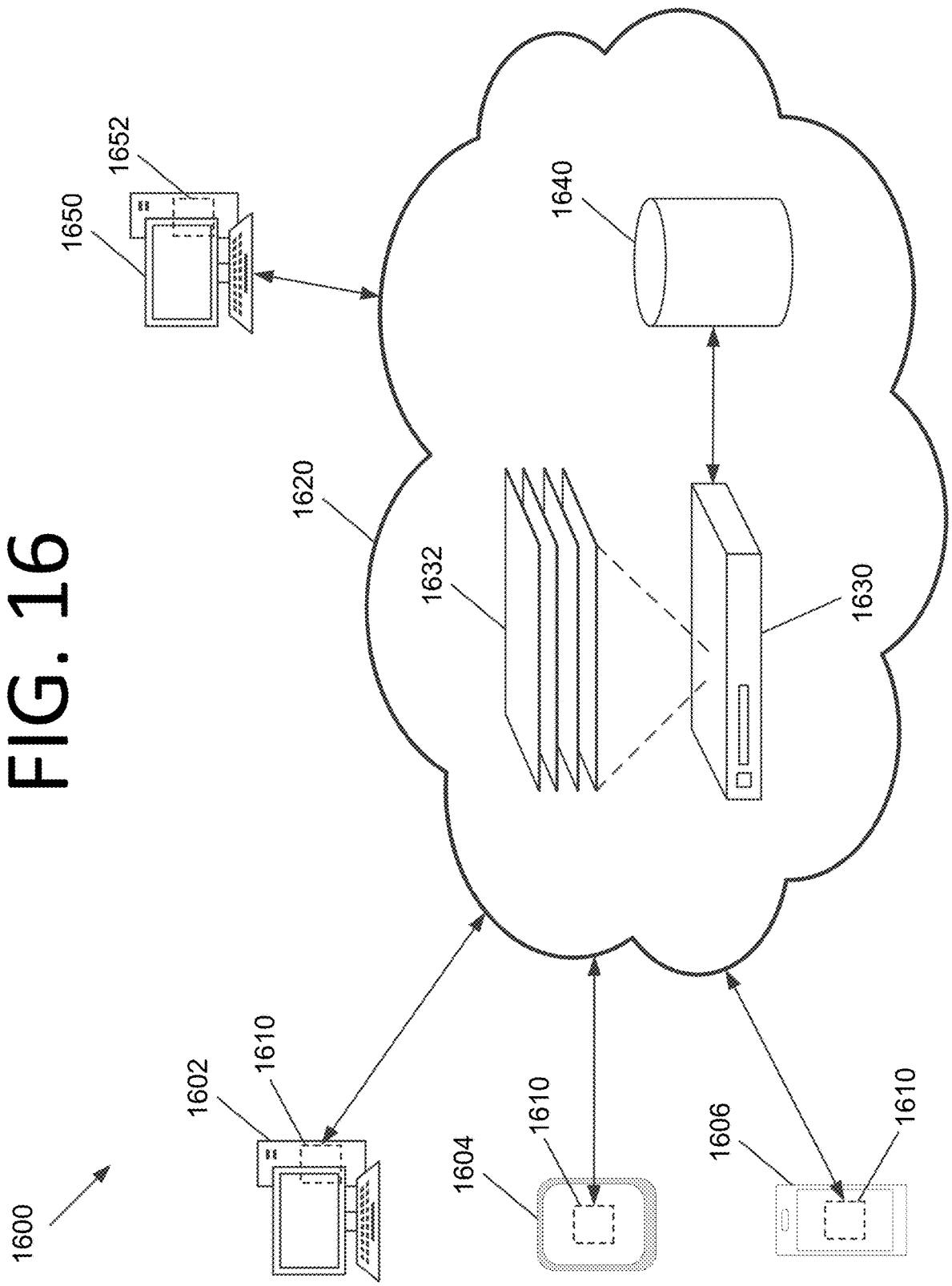
FIG. 16 is an architectural diagram illustrating a system configured to perform detection of typed and/or pasted text, caret tracking, and active element detection, according to an embodiment of the present invention.

FIG. 16 is an architectural diagram illustrating a system 1600 configured to perform detection of typed and/or pasted text, caret tracking, and active element detection, according to an embodiment of the present invention. System 1600 includes user computing systems, such as desktop computer 1602, tablet 1604, and smart phone 1606. However, any desired computing system may be used without deviating from the scope of invention including, but not limited to, smart watches, laptop computers, Internet-of-Things (IoT) devices, vehicle computing systems, etc.

Each computing system 1602, 1604, 1606 has a digital process 1610 running thereon that records screenshots, keystrokes, running applications, application visual elements, visual element locations, application locations, clipboard content, etc. Indeed, any desired information pertaining to screen graphics, user inputs, display elements, etc. may be recorded without deviating from the scope of the invention. In certain embodiments, only video and keystroke recordings are captured initially, and other information is determined subsequently using CV. However, additional information may help to focus and improve the CV process. Digital processes 1610 may be robots generated via an RPA designer application, part of an operating system, a downloadable application for a personal computer (PC) or smart phone, or be any other software and/or hardware without deviating from the scope of the invention. Indeed, in some embodiments, the logic of one or more of digital processes 1610 is implemented partially or completely via physical hardware.

Digital processes 1610 send recorded screenshots, keystrokes, running applications, application elements and locations, etc. via a network 1620 (e.g., a local area network (LAN), a mobile communications network, a satellite communications network, the Internet, any combination thereof, etc.) to a server 1630. In some embodiments, server 1630 may run a conductor application and the data may be sent periodically as part of the heartbeat message. In certain embodiments, the requests may be sent to server 1630 once a predetermined amount of retraining data has been collected, after a predetermined time period has elapsed, or both. Server 1630 stores information from digital processes 1610 in a database 1640.

When instructed by a human user (e.g., an RPA engineer using designer application 1652 of RPA developer computing system 1650), when a predetermined amount of data has been collected in database 1640, as soon as data is received from digital processes 1610, etc., server 1630 runs instances 1632 of detected typed and/or pasted text, caret tracking, and active element detection process for computing systems that server 1630 receives data from. Server may analyze results from instances 1632 to determine what users are doing when interacting with their computing systems.

FIG. 17 is a flowchart illustrating a process 1700 for performing preprocessing, text detection, caret tracking, and active element detection, according to an embodiment of the present invention. The process begins with determining changes between a current screenshot frame and a previous screenshot frame (and potentially at least one other previous screenshot frame) at 1705. If a threshold is exceeded at 1710 (e.g., more than a certain number of pixels have changed, more than a certain number of regions have changed, a region has more than a certain number of blocks, etc.), it is likely that the screen has changed substantially and new graphical elements may be present. Thus, CV preprocessing is performed on the current screenshot frame at 1715 to determine types and locations of graphical elements in the current screenshot frame and the process proceeds to the next frame at 1720. It should be noted that "current screenshot frame" and "previous screenshot frame" are relative. As the process advances to the next screenshot frame, that screenshot frame becomes the current screenshot frame, and the former current screenshot frame becomes the previous screenshot frame.

If the threshold was not exceeded at 1710, the system attempts to identify the active element without performing OCR at 1725. In some embodiments, the CV preprocessing and the process for attempting to identify the active element without OCR is performed in accordance with all or part of FIG. 15. If successful at 1730, the process proceeds to the next frame at 1720. Otherwise, the process proceeds with performing typed text detection, caret tracking, and/or clipboard content detection in accordance with the embodiments described herein. In some embodiments, the process(es) for performing typed text detection, caret tracking, and/or clipboard content detection may be in accordance with all or part of those described with respect to FIGS. 6, 7, and 9-13B.

The process steps performed in FIGS. 6, 7, 9-13B, 15, and 17 may be performed by a computer program, encoding instructions for the processor(s) to perform at least part of the process(es) described in FIGS. 6, 7, 9-13B, 15, and 17, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 6, 7, 9-13B, 15, and 17, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program for preprocessing screenshot frames and detecting active elements embodied on a non-transitory computer-readable medium, the program configured to cause at least one processor to:
when a current screenshot frame does not change more than a threshold relative to a previous screenshot frame:
run computer vision (CV) preprocessing on the previous screenshot frame,
determine types and locations of graphical elements in the previous screenshot frame,
determine that a change occurred in a region where the current screenshot frame differs from the previous screenshot frame, the region at least partially included within an area of one or more graphical elements that permit text entry, and
when the change occurred in one graphical element that permits text entry, set the graphical element where the change occurred as an active element; and
when the current screenshot frame changes more than a threshold relative to the previous screenshot frame:
wait until a new current screenshot frame does not change more than the threshold relative to a new previous screenshot frame, and
when the new current screenshot frame does not change more than the threshold relative to the new previous screenshot frame:
run the CV preprocessing on the new current screenshot frame, and
determine types and locations of graphical elements in the new current screenshot frame.

2. The computer program of claim 1, wherein the program is further configured to cause the at least one processor to:
generate a keyboard character queue of key press events that occurred during a time window;
determine that changes occurred in two or more graphical elements that permit text entry between the current screenshot frame and the previous screenshot frame;
determine newly added key press events that occurred between the previous screenshot frame and the current screenshot frame;
perform optical character recognition (OCR) on regions of the two or more graphical elements where the changes occurred;
match the newly added key press events to one of the two or more graphical elements where the changes occurred; and
set the matched graphical element as the active element.

3. The computer program of claim 1, wherein the program is further configured to cause the at least one processor to:
fetch a next screenshot frame; and
repeat the process using the next screenshot frame as the current screenshot frame and using the current screenshot frame as the previous screenshot frame.

4. The computer program of claim 1, wherein the program is further configured to cause the at least one processor to:
pause determination of changes between screenshot frames while the CV preprocessing is running.

5. The computer program of claim 1, wherein the program is further configured to cause the at least one processor to:
perform caret tracking to identify a caret; and
identify the active element in the current screenshot frame as the graphical element that includes the caret.

6. The computer program of claim 1, wherein
the current screenshot frame and previous screenshot frame are compressed in a lossy format, and
the determining of the region where the current screenshot frame differs from the previous screenshot frame comprises applying one or more tolerances to the region.

7. The computer program of claim 1, wherein when determining the region where the current screenshot frame differs from the previous screenshot frame, the program is further configured to cause the at least one processor to:
apply fuzzy image matching to a region from the current screenshot frame and a corresponding region from the previous screenshot frame to determine whether a change occurred in the region.

8. The computer program of claim 1, wherein the program is a robotic process automation (RPA) robot.

9. The computer program of claim 1, wherein when more than a predetermined percentage of the pixels of the current screenshot frame differ from the previous screenshot frame, the current screenshot frame is ignored and the logic proceeds to a next screenshot frame.

10. A computer program for preprocessing screenshot frames and detecting active elements embodied on a non-transitory computer-readable medium, the program configured to cause at least one processor to:
run computer vision (CV) preprocessing on a previous screenshot frame;
determine types and locations of graphical elements in the previous screenshot frame;
determine that a change occurred in a region where a current screenshot frame differs from the previous screenshot frame, the region at least partially included within an area of one or more graphical elements that permit text entry;
when the change occurred in one graphical element that permits text entry, set the graphical element where the change occurred as an active element; and
when the change occurred in more than one graphical element that permits text entry:
generate a keyboard character queue of key press events that occurred during a time window, determine newly added key press events that occurred between the previous screenshot frame and the current screenshot frame, perform optical character recognition (OCR) on regions of the two or more graphical elements where the changes occurred, match the newly added key press events to one of the two or more graphical elements where the changes occurred, and set the matched graphical element as the active element.

11. The computer program of claim 10, wherein the program is further configured to cause the at least one processor to:

fetch a next screenshot frame; and repeat the process using the next screenshot frame as the current screenshot frame and using the current screenshot frame as the previous screenshot frame.

12. The computer program of claim 10, wherein the program is further configured to cause the at least one processor to:

pause determination of changes between screenshot frames while the CV preprocessing is running.

13. The computer program of claim 10, wherein when the current screenshot frame changes more than a threshold relative to the previous screenshot frame, the program is further configured to cause the at least one processor to:

wait until a new current screenshot frame does not change more than the threshold relative to a new previous screenshot frame; and when the new current screenshot frame does not change more than the threshold relative to the new previous screenshot frame:

run the CV preprocessing on the new current screenshot frame, and determine types and locations of graphical elements in the new current screenshot frame.

14. The computer program of claim 10, wherein the program is further configured to cause the at least one processor to:

perform caret tracking to identify a caret; and identify an active element in the current screenshot frame that includes the caret.

15. The computer program of claim 10, wherein the program is a robotic process automation (RPA) robot.

16. The computer program of claim 10, wherein when more than a predetermined percentage of the pixels of the current screenshot frame differ from the previous screenshot frame, the current screenshot frame is ignored and the logic proceeds to a next screenshot frame.

17. A computer-implemented method for preprocessing screenshot frames and detecting active elements for robotic process automation (RPA), comprising:

when a current screenshot frame does not change more than a threshold relative to a previous screenshot frame:

running computer vision (CV) preprocessing on a previous screenshot frame, by an RPA robot, determining types and locations of graphical elements in the previous screenshot frame, determining that a change occurred in a region where a current screenshot frame differs from the previous screenshot frame, by the RPA robot, the region at least partially included within an area of one or more graphical elements that permit text entry, and when the change occurred in one graphical element that permits text entry, setting the graphical element where the change occurred as an active element, by the RPA robot; and when the current screenshot frame changes more than a threshold relative to the previous screenshot frame:

waiting until a new current screenshot frame does not change more than the threshold relative to a new previous screenshot frame, by the RPA robot; and when the new current screenshot frame does not change more than the threshold relative to the new previous screenshot frame:

running the CV preprocessing on the new current screenshot frame, by the RPA robot, and determining types and locations of graphical elements in the new current screenshot frame, by the RPA robot.

18. The computer-implemented method of claim 17, further comprising:

generating a keyboard character queue of key press events that occurred during a time window, by the RPA robot;

determining that changes occurred in two or more graphical elements that permit text entry between the current screenshot frame and the previous screenshot frame, by the RPA robot;

determining newly added key press events that occurred between the previous screenshot frame and the current screenshot frame, by the RPA robot;

performing optical character recognition (OCR) on regions of the two or more graphical elements where the changes occurred, by the RPA robot;

matching the newly added key press events to one of the two or more graphical elements where the changes occurred, by the RPA robot; and setting the matched graphical element as the active element, by the RPA robot.

19. The computer-implemented method of claim 17, further comprising:

performing caret tracking to identify a caret, by the RPA robot; and identifying the active element in the current screenshot frame as the graphical element that includes the caret, by the RPA robot.

* * * * *